(12) United States Patent
Sweetwood et al.

(10) Patent No.: US 10,443,661 B2
(45) Date of Patent: Oct. 15, 2019

(54) UNIVERSAL JOINT WITH CENTRAL ELEMENT

(71) Applicant: CCTY USA BEARING CO., Lake Zurich, IL (US)

(72) Inventors: John J. Sweetwood, Lake Zurich, IL (US); Richard C. Perlberg, Lake Zurich, IL (US)

(73) Assignee: CCYT USA Bearing Co., Lake Zurich, IL (US)

( * ) Notice: Subject to any disclaimer, the term of this patent is extended or adjusted under 35 U.S.C. 154(b) by 178 days.

(21) Appl. No.: 15/399,256

(22) Filed: Jan. 5, 2017

(65) Prior Publication Data

US 2017/0211632 A1    Jul. 27, 2017

Related U.S. Application Data

(60) Provisional application No. 62/276,432, filed on Jan. 8, 2016, provisional application No. 62/296,338, filed on Feb. 17, 2016, provisional application No. 62/396,348, filed on Sep. 19, 2016.

(51) Int. Cl.
   *F16D 3/34*      (2006.01)
   *F16D 3/38*      (2006.01)

(52) U.S. Cl.
   CPC .............. *F16D 3/34* (2013.01); *F16D 3/385* (2013.01); *F16D 3/387* (2013.01); *Y10T 29/49959* (2015.01)

(58) Field of Classification Search
   CPC . F16D 3/34; F16D 3/387; F16D 3/385; Y10T 29/499959

USPC ................................ 464/112, 150, 151, 155
See application file for complete search history.

(56) References Cited

U.S. PATENT DOCUMENTS

| | | |
|---|---|---|
| 269,473 A | 12/1882 | Shay |
| 478,811 A | 7/1892 | Oehring |
| 608,625 A | 8/1898 | Richards |
| 761,943 A * | 6/1904 | Brown |
| 1,145,400 A * | 7/1915 | Bowen .................... F16D 3/185 464/150 |
| 2,219,591 A | 10/1940 | Heister |
| 2,641,115 A | 6/1953 | Garrison |

(Continued)

FOREIGN PATENT DOCUMENTS

| AU | 33986/78 | 9/1979 |
|---|---|---|
| BG | 001062 U1 | 5/2008 |

(Continued)

OTHER PUBLICATIONS

International Search Report in PCT Application No. PCT/US2017/012314 dated Mar. 24, 2017, 2 pages.

(Continued)

*Primary Examiner* — Greg Binda
(74) *Attorney, Agent, or Firm* — Brinks Gilson & Lione

(57) ABSTRACT

A linkage system for transmitting torque includes a central element, an input arm and an output arm. The central element has four sides and a top and bottom. The input arm and an output arm each have a head portion for connecting with the central element and a body portion. The head portion of each of the input and output arms defines a bearing surface having a first radius. The input and output arms engage the central element such that the bearing surfaces of the heads are offset by 90 degrees.

22 Claims, 17 Drawing Sheets

(56) References Cited

U.S. PATENT DOCUMENTS

| | | | |
|---|---|---|---|
| 2,954,685 A | | 10/1960 | Cuq |
| 3,899,898 A | * | 8/1975 | Takahashi ............... F16D 3/223 |
| | | | 464/144 |
| 5,423,722 A | | 6/1995 | Beauch et al. |
| 5,440,839 A | | 8/1995 | Piltingsrud |

FOREIGN PATENT DOCUMENTS

| | | | | |
|---|---|---|---|---|
| CN | 103161831 A | | 6/2013 | |
| GB | 26781 | | 12/1902 | |
| GB | 3519 | * | 9/1910 | ................... 464/150 |
| GB | 274345 | * | 7/1927 | ................... 464/150 |
| GB | 589513 | | 6/1947 | |
| GB | 971401 | | 9/1964 | |
| GB | 995526 | | 6/1965 | |
| JP | 35753124 U | | 3/1982 | |
| JP | 2-097721 | | 4/1990 | |
| JP | H09-133152 A | | 5/1997 | |
| KR | 19980038301 U | | 9/1998 | |
| RU | 2 499 918 C1 | | 11/2013 | |
| SU | 480460 T | | 8/1975 | |

OTHER PUBLICATIONS

Written Opinion of the ISA in PCT Application No. PCT/US2017/012314 dated Mar. 24, 2017, 9 pages.
FIG. 1 (Prior art) for U.S. Appl. No. 15/399,256, filed Jan. 5, 2017, 1 page.
European Search Report for European Application No. EP17736321 dated Aug. 1, 2019 (7 pgs).

* cited by examiner

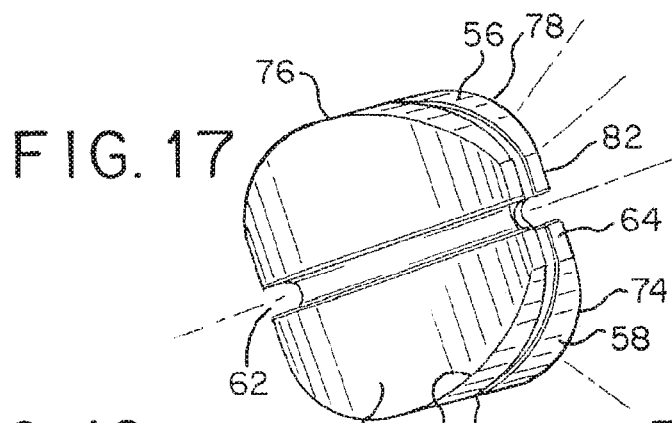
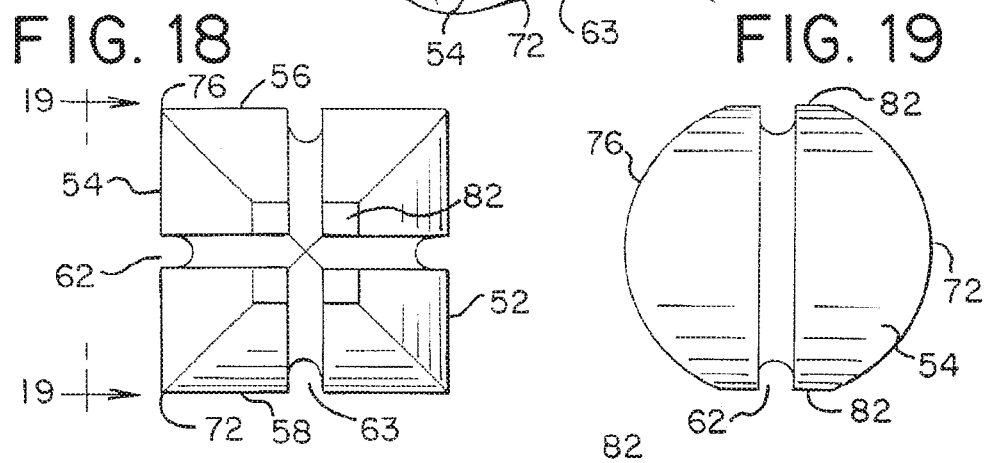
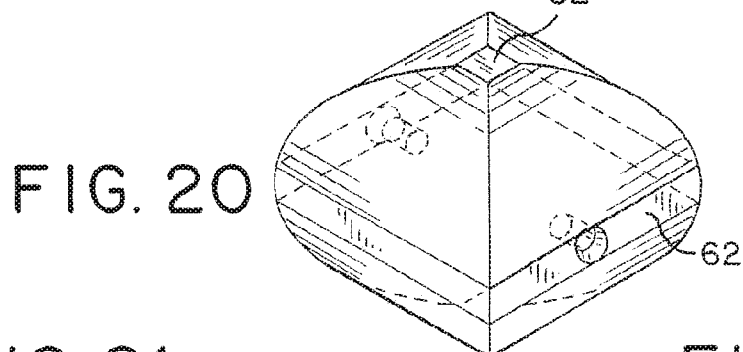
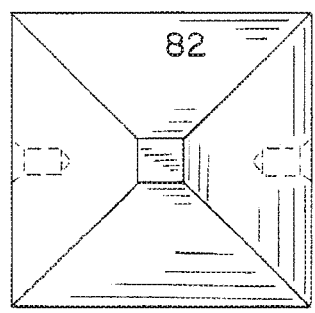
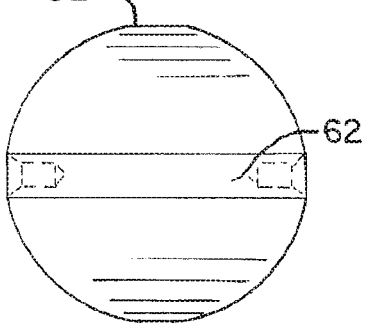

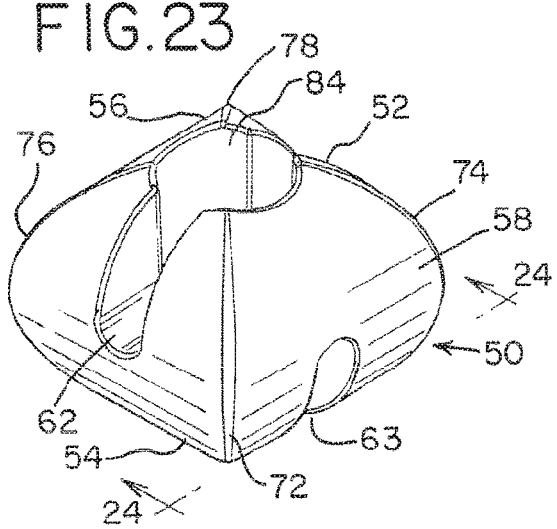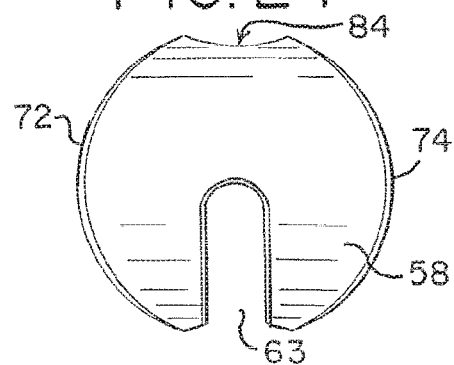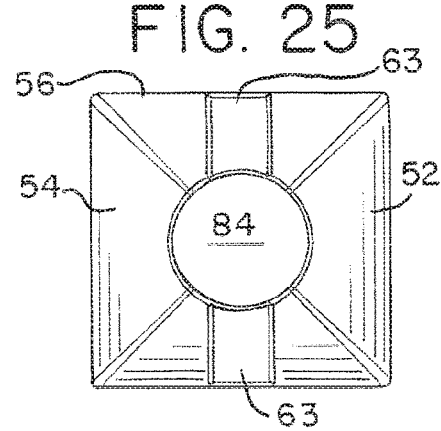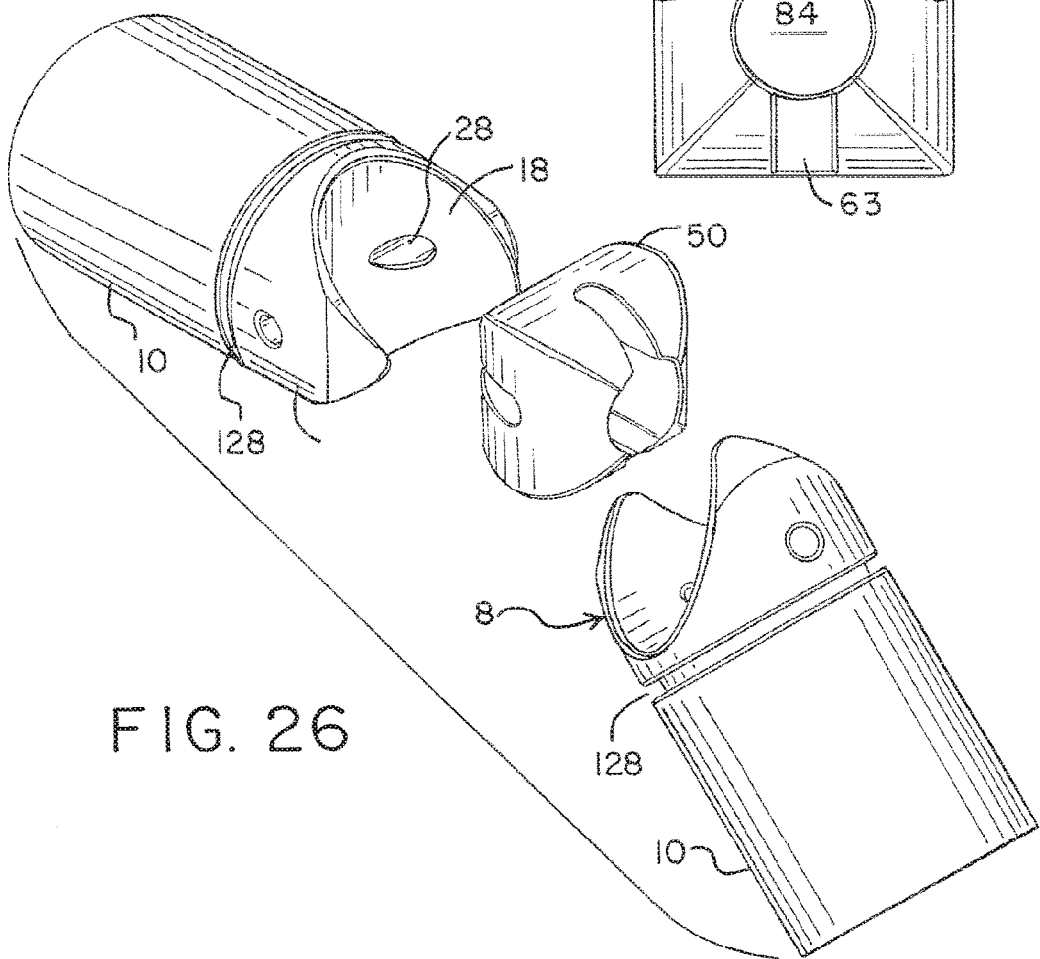

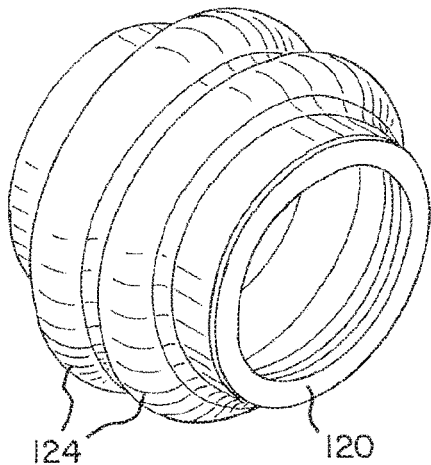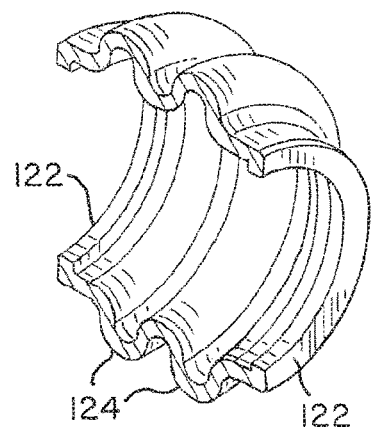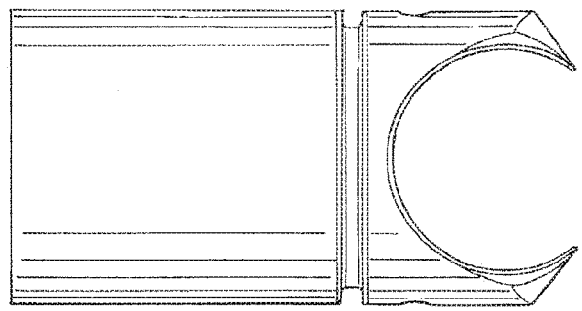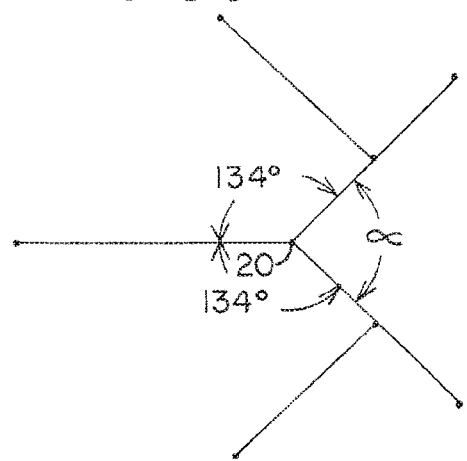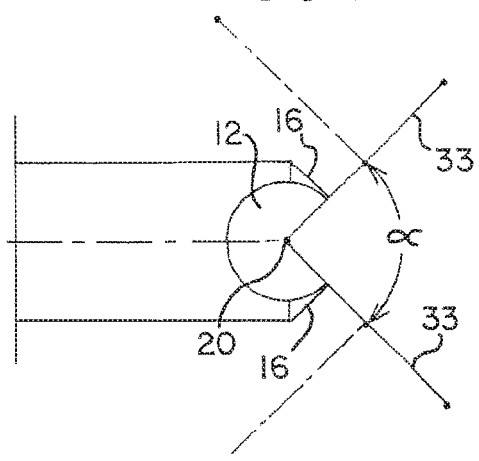

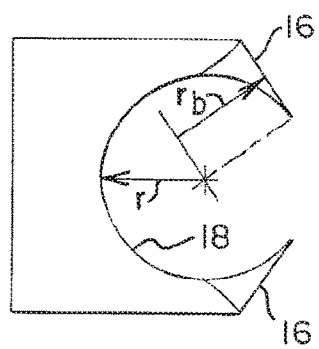
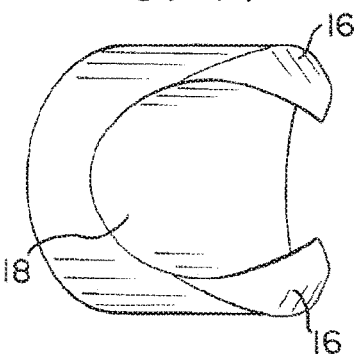
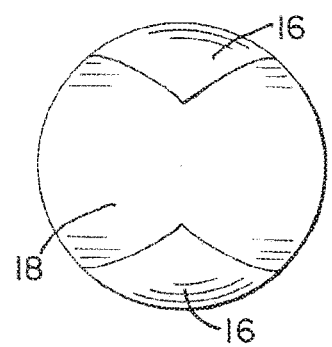
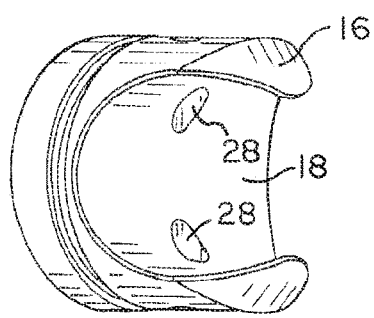
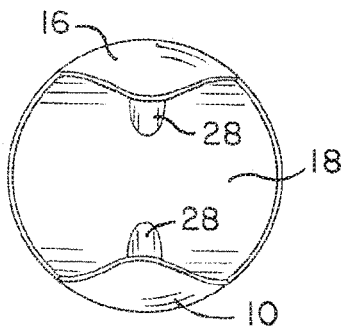
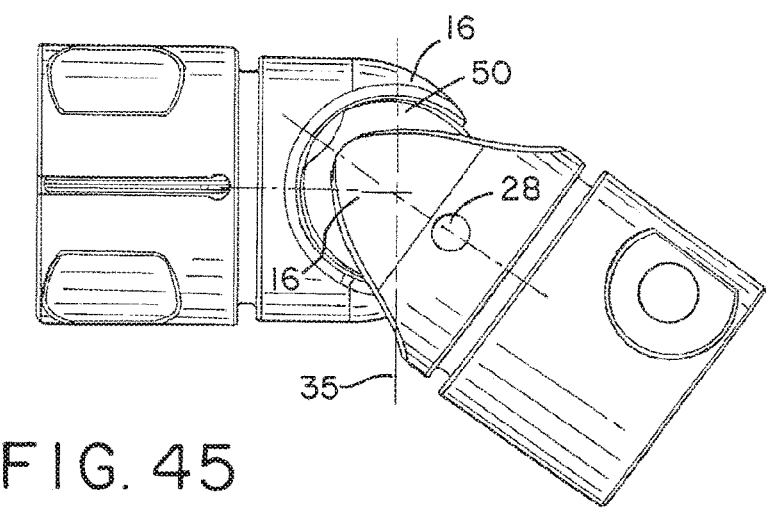

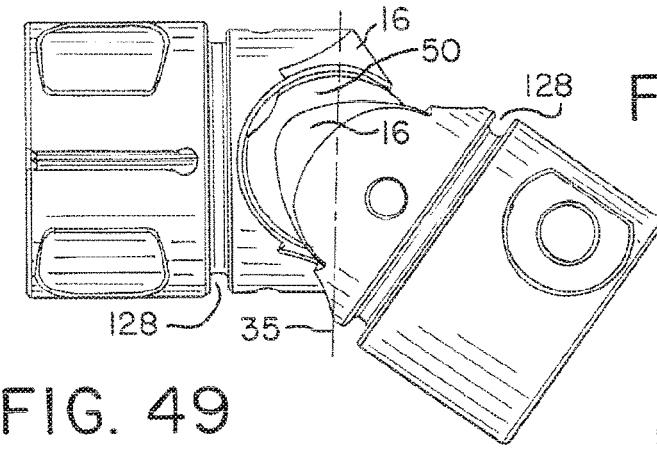
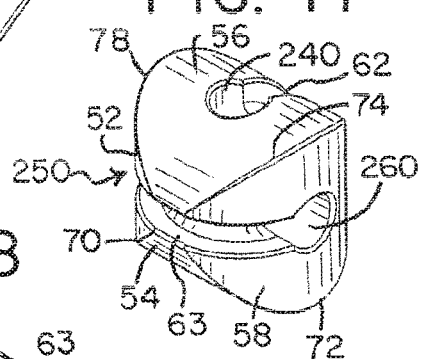
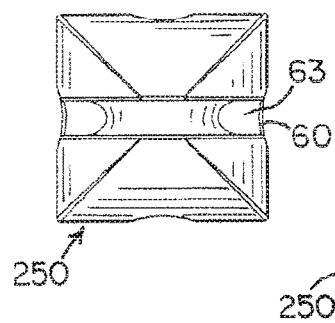
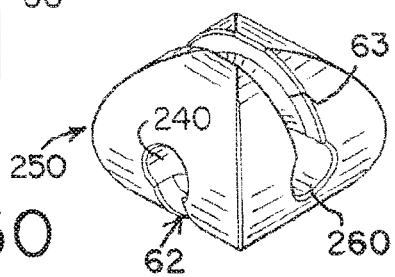
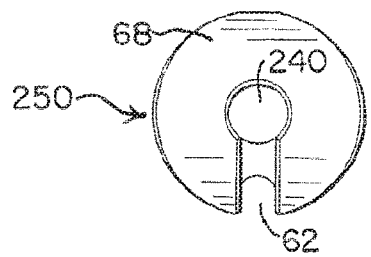
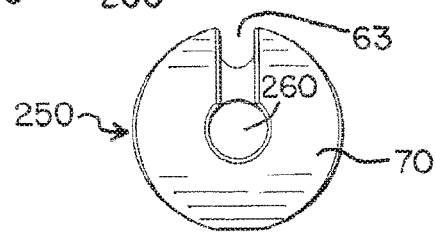
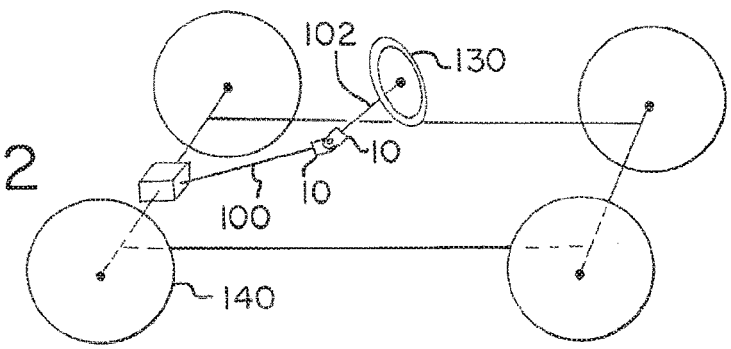

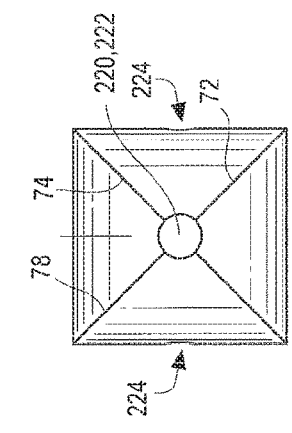
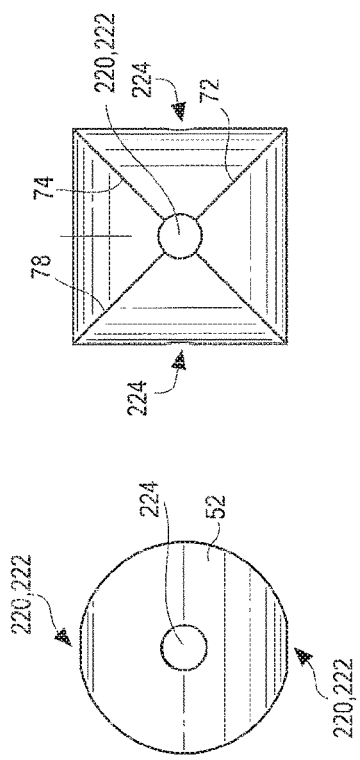
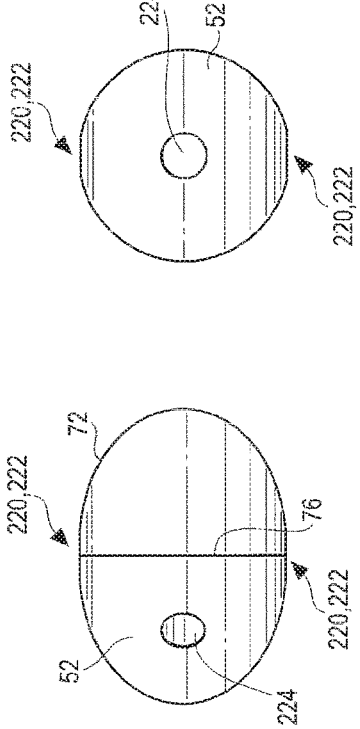
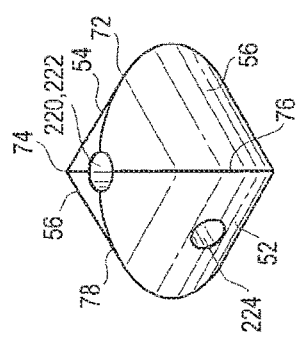
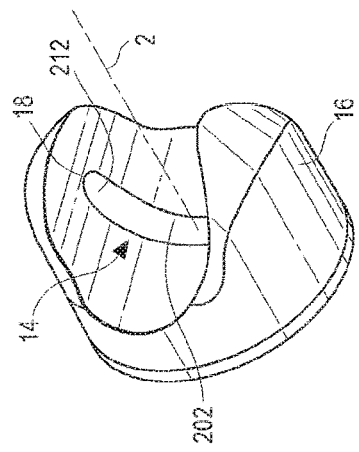
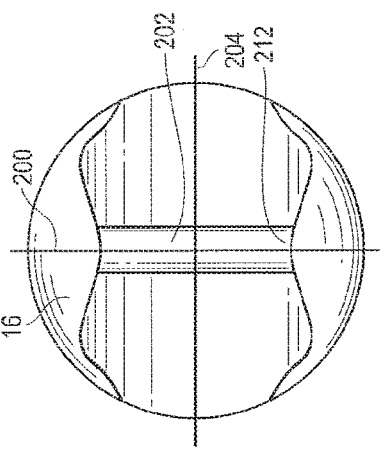
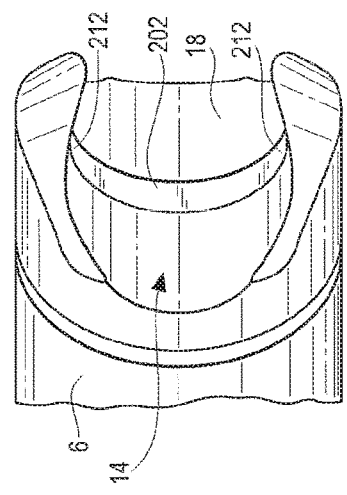

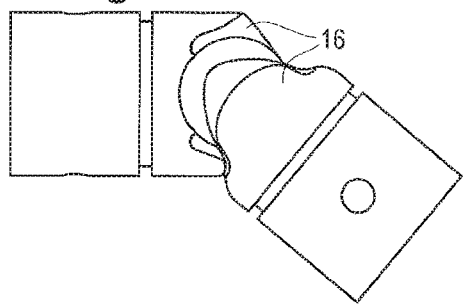
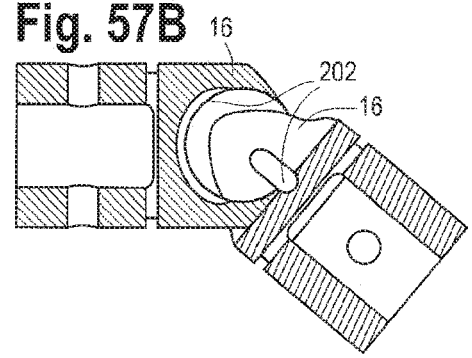
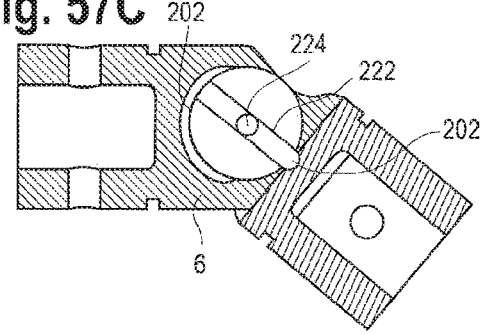
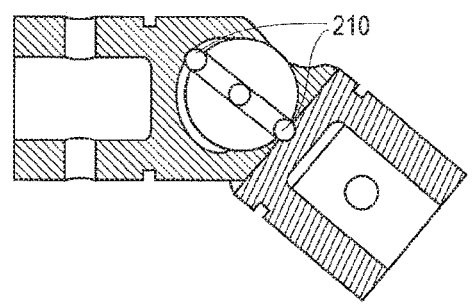
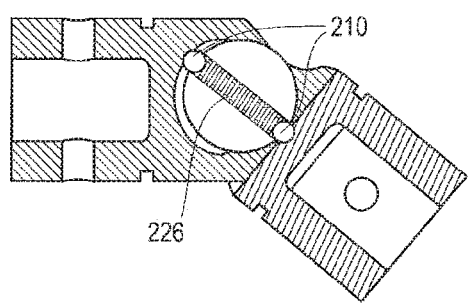

UNIVERSAL JOINT WITH CENTRAL ELEMENT

This application claims the benefit of U.S. Provisional Application 62/276,432, filed Jan. 8, 2016, U.S. Provisional Application 62/296,338, filed Feb. 17, 2016, and U.S. Provisional Application No. 62/396,348, filed Sep. 19, 2016, all entitled UNIVERSAL JOINT WITH CENTRAL ELEMENT, the entire disclosures of which are hereby incorporated herein by reference.

FIELD

The present disclosure relates to apparatuses and methods for universal joints.

BACKGROUND

The statements in this section merely provide background information related to the present disclosure and may not constitute prior art.

A universal joint (see FIG. 1) is a component that allows transmission of rotational motion and work through angled axis. Some common uses for universal joints may include steering columns, flap deployment systems, and vehicle door systems.

In many applications, the universal joint may experience bending loads, which may be repetitive and alternating. Indeed, the universal joints may endure, and be exposed to, stress over long periods of time, for example 20 years in the case of commercial aircraft flap deploying systems. In various applications, the angle of offset between an input and output arm may lead to additional and increasing loads. Moreover, for angles of offset greater than 35 degrees, the yokes of the input and output arms may be susceptible to binding or interference. This limitation may lead to a requirement for additional joints to accommodate the needed angular offset. In addition, high torque applications may require a larger universal joint, which may be difficult to accommodate in certain applications having space limitations, such as steering column assemblies.

FIG. 1 is an example of a prior art universal joint that illustrates the added complexity of assembly due to the number of components. Also, the load transmission may be limited due to the pin and yoke sizing.

Further areas of applicability will become apparent from the description provided herein. It should be understood that the description and specific examples are intended for purposes of illustration only and are not intended to limit the scope of the present disclosure.

SUMMARY

The present invention is defined by the following claims, and nothing in this section should be considered to be a limitation on those claims.

In one aspect, one embodiment of a linkage system for transmitting torque includes a central element, an input arm and an output arm. The central element has four sides that define elliptical shapes in projected planar views and a top and bottom that define generally rectangular shapes in projected planar views. The input arm and an output arm each define a proximal and distal end portion extending along an axis, with the distal end portion having a head portion for connecting with the central element and the proximal portion defining a body portion. The head portion of each of the input and output arms defines a bearing surface having a first radius. The input and output arms engage the central element such that the bearing surfaces of each head portion are offset by 90 degrees. The central element may have a groove, with a retaining member coupled to the input or output arm and disposed in the groove.

In another aspect, one embodiment of a steering assembly includes a steering interface coupled to the linkage assembly.

In yet another aspect, a method for assembling a linkage system includes aligning a central element, having opposite first and second bearing surfaces each defined by a first radius, with a c-shaped cavity of a head portion of an input arm, wherein the cavity defines a third bearing surface, sliding the central element into the cavity of the head portion of the input arm with the first and second bearing surfaces engaging the third bearing surface, inserting a first pin through a first passage in the head portion of the input arm, and disposing the first pin in a first groove extending around at least a portion of a perimeter of the central element. In one embodiment, the method further includes aligning the central element, having opposite third and fourth bearing surfaces each defined by a second radius, with a c-shaped cavity of a head portion of an output arm, wherein the cavity defines a fifth bearing surface, sliding the central element into the cavity of the head portion of the output arm with the third and fourth bearing surfaces engaging the fifth bearing surface, inserting a second pin through a second passage in the head portion of the output arm, and disposing the second pin in a second groove extending around at least a portion of a perimeter of the central element.

In yet another aspect, an arm has a head portion defining an inner cylindrically shaped bearing surface having a first axis and a first radius. The arm has a beak portion defining in part the inner bearing surface. The beak portion has an outer cylindrically shaped surface having a second axis and a second radius. In one embodiment, the first and second radii are the same, and the first and second axes intersect.

The various embodiments of the linkage assembly, steering assembly and method of assembling a linkage assembly provide significant advantages over other linkage and steering assemblies and methods. For example and without limitation, the linkage assembly can transmit higher torques over a greater offset angle. In addition, the linkage assemblies may be made relatively compact, with minimal parts and assembly steps, thereby allowing for quicker and less costly installations and replacements.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DRAWINGS

In order that the disclosure may be well understood, there will now be described various forms thereof, given by way of example, reference being made to the accompanying drawings, in which.

Figure 7:
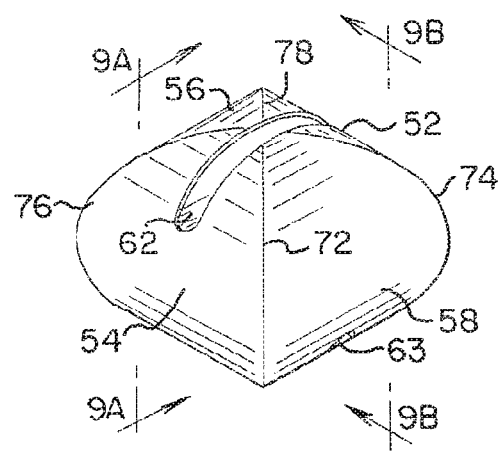
FIG. 7 is a perspective view of one embodiment of a central element.
Figure 9A:
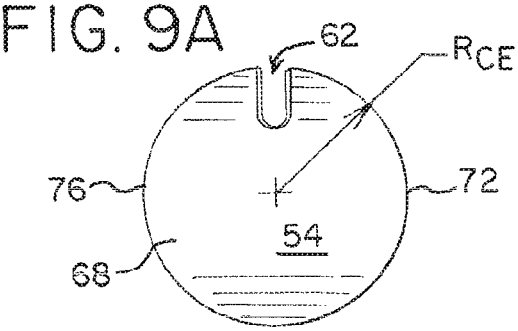
Figure 9B:
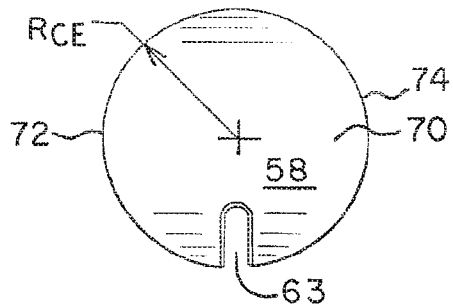

FIGS. 9A and B are opposite side views of the central element shown in FIG. 7.

Figure 10:
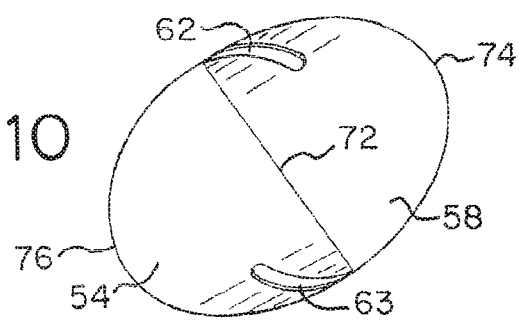

FIG. 10 is a corner view of the central element shown in FIG. 7.

Figure 11:
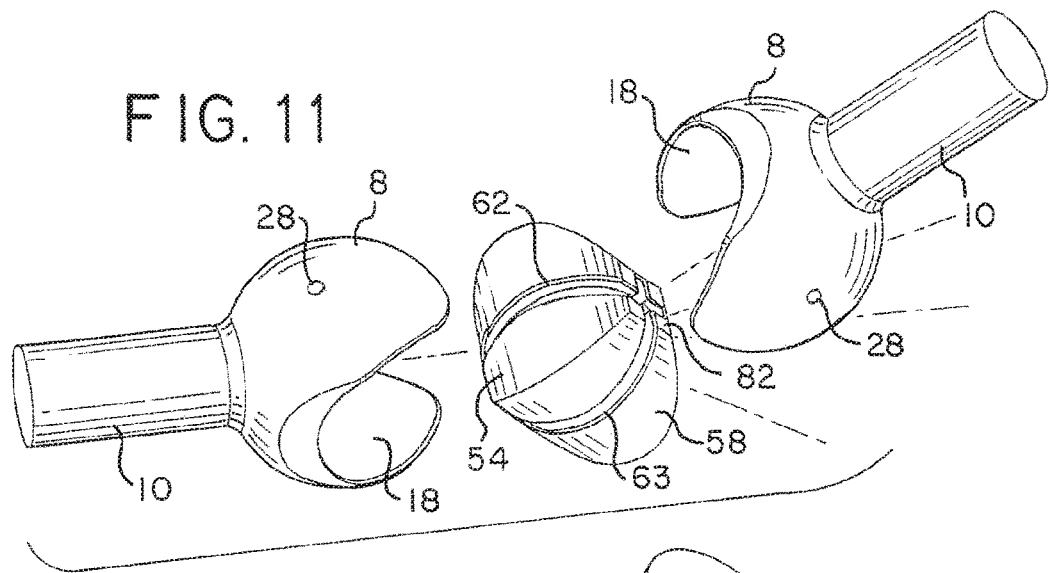

FIG. 11 is an exploded, perspective view of one embodiment of a linkage system.

Figure 12:
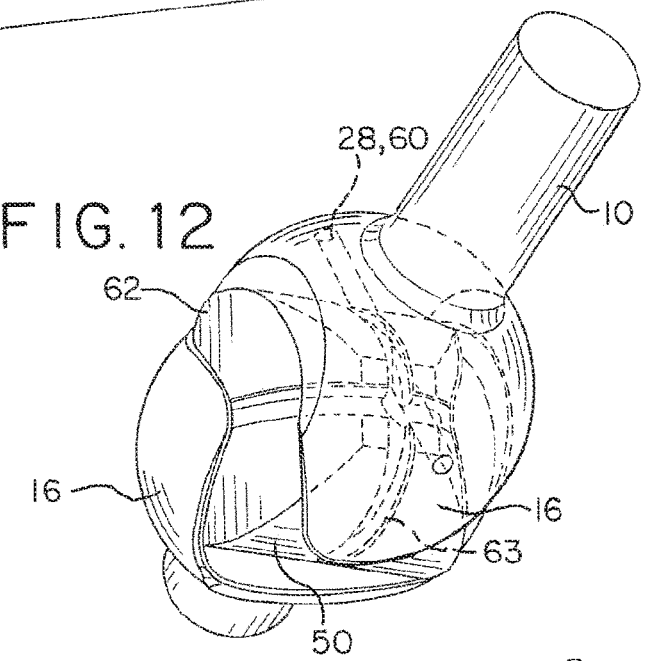

FIG. 12 is a perspective view of the linkage system shown in FIG. 11.

Figure 13:
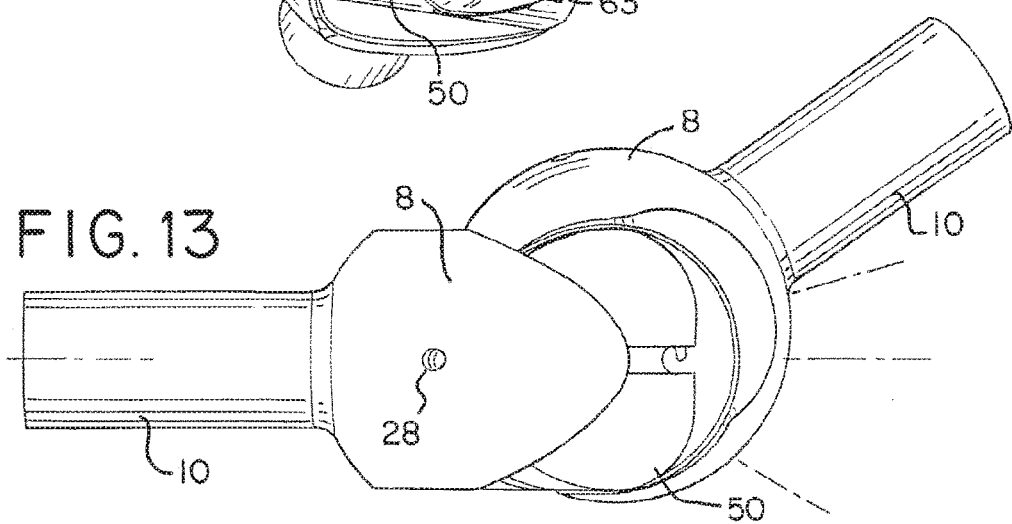

FIG. 13 is a side view of the linkage system shown in FIG. 11.

Figure 14:
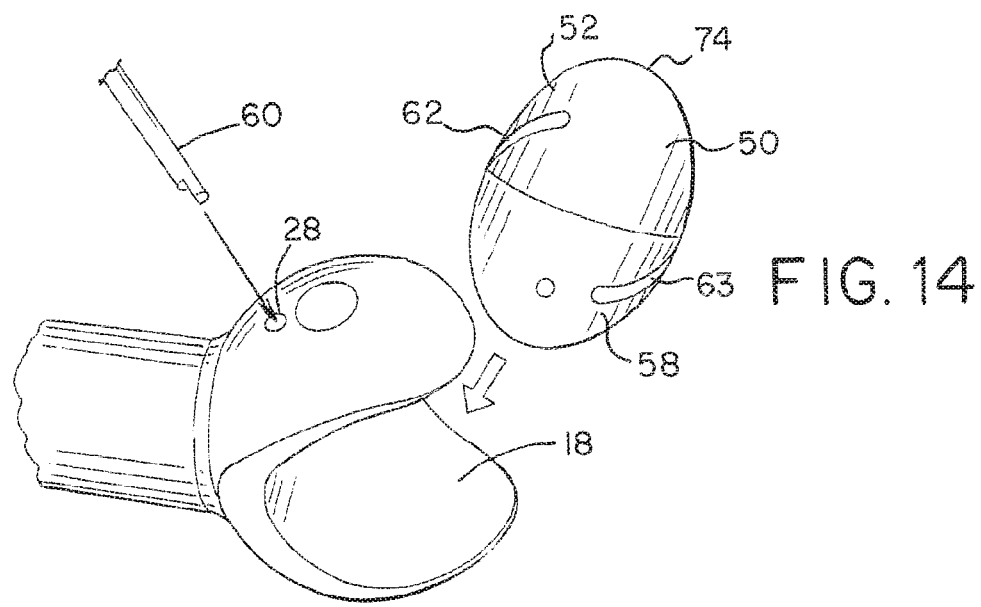
Figure 15:
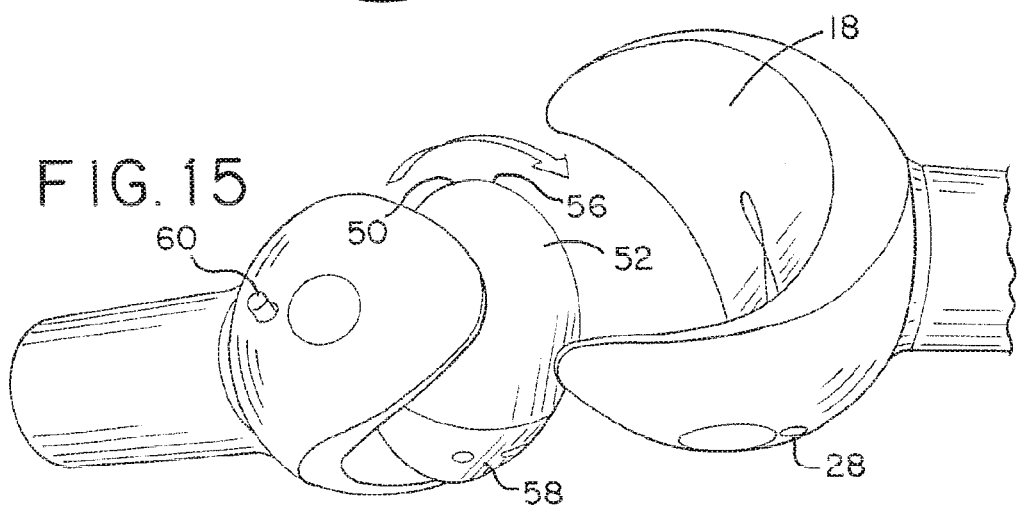
Figure 16:
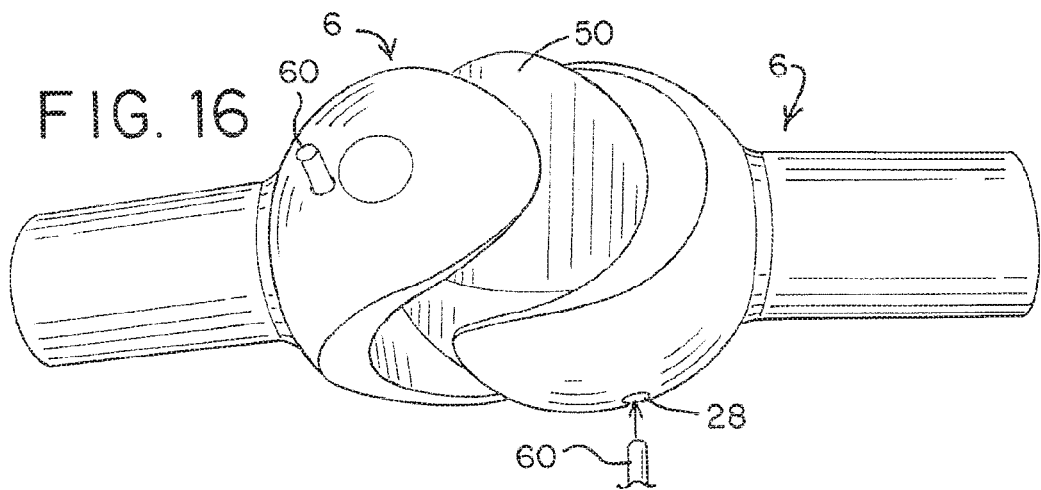

FIGS. 14-16 illustrate the assembly of an exemplary embodiment of the linkage system.

FIG. 17 is a perspective view of one embodiment of a central element.

FIG. 18 is a top or bottom view of the central element shown in FIG. 17.

FIG. 19 is a side view of the central element shown in FIG. 17.

FIG. 20 is a perspective view of another embodiment of the central element.

FIG. 21 is a top or bottom view of the central element shown in FIG. 20.

FIG. 22 is a side view of the central element shown in FIG. 20.

FIG. 23 is a perspective view of another embodiment of a central element.

FIG. 24 is a side view of the central element shown in FIG. 23.

FIG. 25 is a top or bottom view of the central element shown in FIG. 23.

FIG. 26 is an exploded, perspective view of another embodiment of a linkage assembly.

FIG. 27 is a perspective view of one embodiment of a protective boot.

FIG. 28 is a cut-away view of the protective boot shown in FIG. 27.

FIG. 29 is a side view of another embodiment of an input or output arm.

FIGS. 30A and B are diagrams illustrating the clearance at 45 degree offset.

Figure 31:
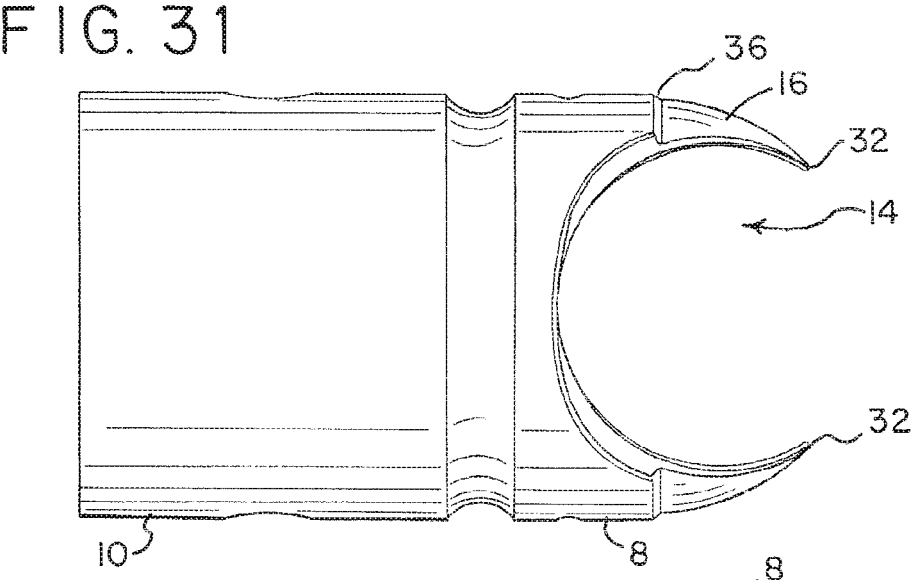

FIG. 31 is a side view of another embodiment of an input or output arm.

Figure 32:
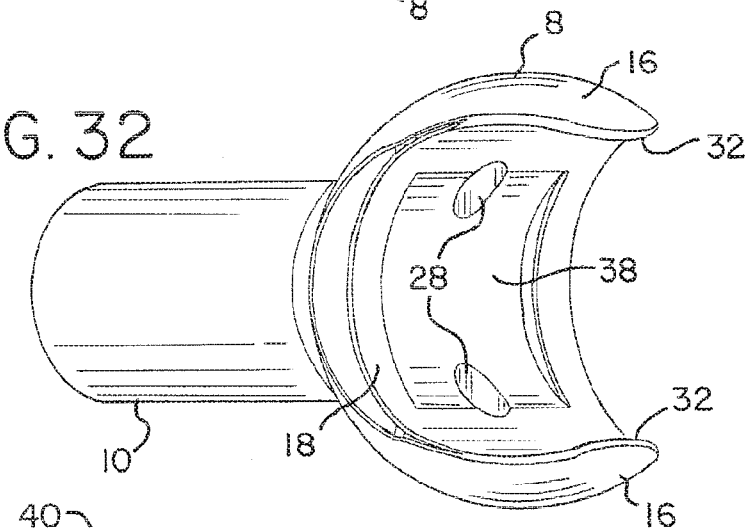

FIG. 32 is a perspective view of another embodiment of an input or output arm.

Figure 33:
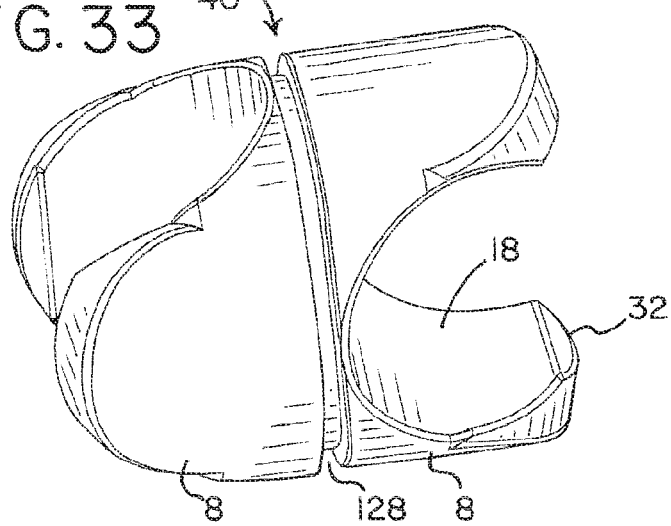

FIG. 33 is a perspective view of dual head arm.

Figure 34:
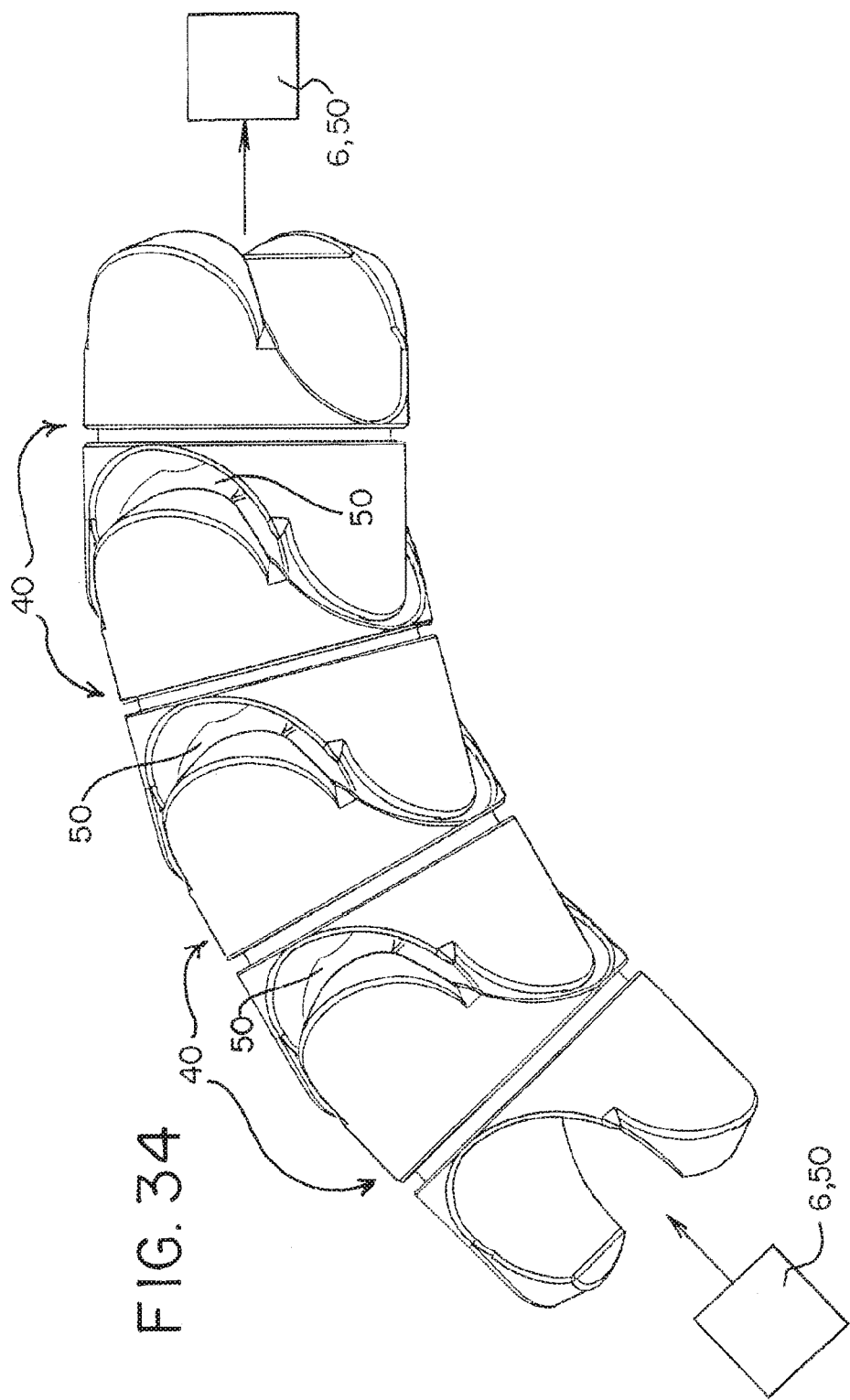

FIG. 34 is a perspective view of a linkage assembly having a plurality of dual head arms as shown in FIG. 33.

Figure 35:
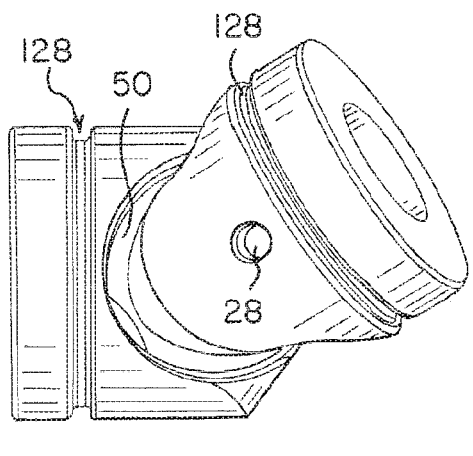
Figure 36:
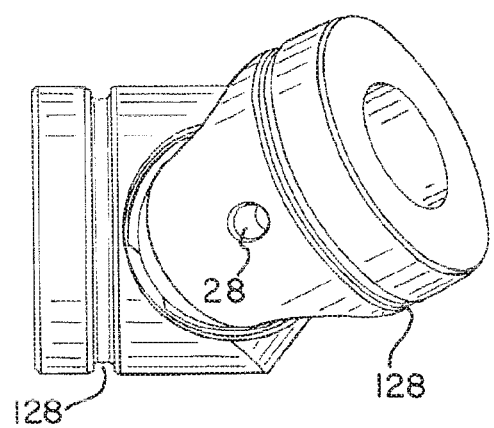
Figure 37:
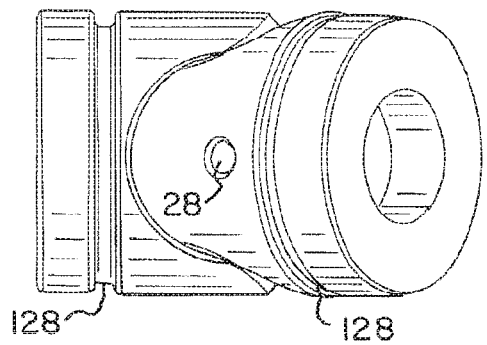

FIGS. 35-37 show a linkage rotating through a maximum angle.

Figure 38:
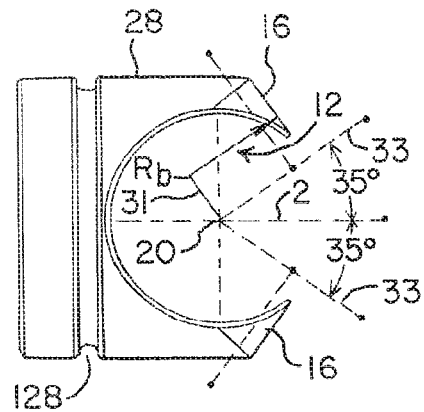
Figure 39:
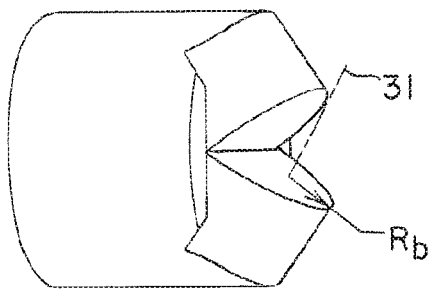

FIGS. 38 and 39 are various illustrations of the head portion during an intermediate design stage.

FIGS. 40-42 are various illustrations of the head portion during an intermediate design stage.

FIGS. 43 and 44 are various illustrations of the head portion during a final design stage.

FIG. 45 is a side view of one embodiment of a linkage assembly.

FIG. 46 is a side view of another embodiment of a linkage assembly.

FIGS. 47-51 are various views of another embodiment of a central element.

FIG. 52 is a perspective view of a vehicle schematic with a linkage assembly having input and output devices coupled thereto.

Figure 53:
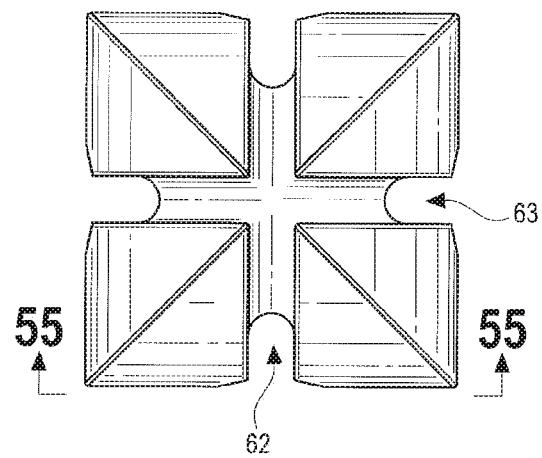
Figure 54:
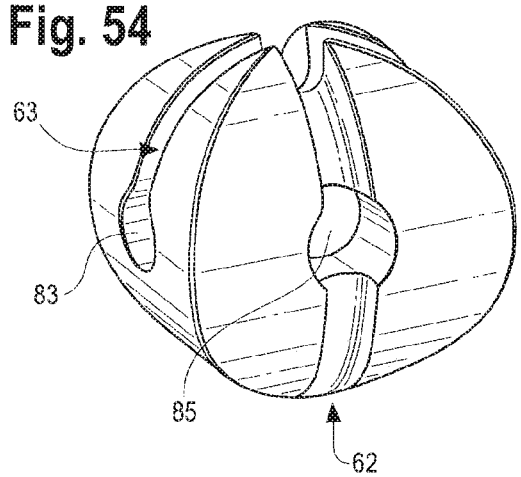
Figure 55:
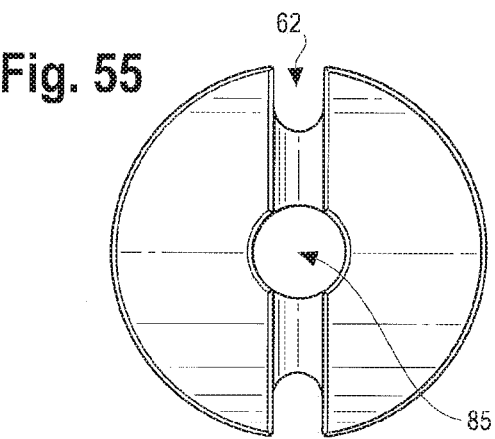
Figure 59A:
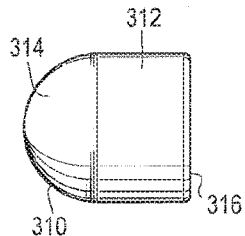
Figure 59B:
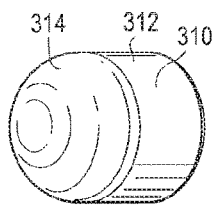
Figure 59C:
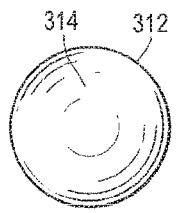
Figure 59D:
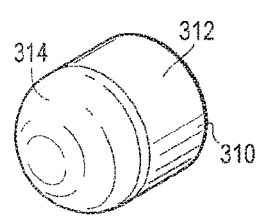

FIGS. 53-55 show different views of another embodiment of a central element.

FIGS. 56A-D show perspective, corner/diagonal, side and top views of another embodiment of a central element.

FIGS. 57A-E show a side view of another embodiment of an assembly, and cross-sectional views without a central element or retaining members, with a central element but no retaining members, with a central element and retaining members and with a central element, retaining members and a biasing member respectively.

FIGS. 58A-C show perspective and front views of another embodiment of an input or output arm.

FIGS. 59A-D show an alternative embodiment of a retaining member.

Figure 60A:
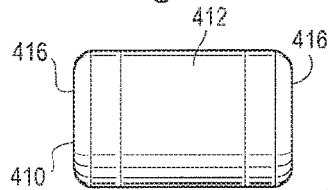
Figure 60B:
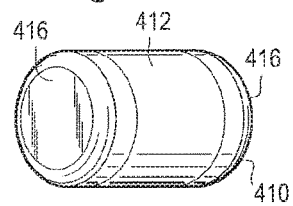
Figure 60C:
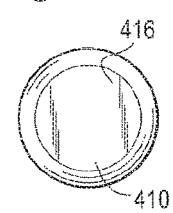

FIGS. 60A-C show an alternative embodiment of a retaining element.

Figure 61A:
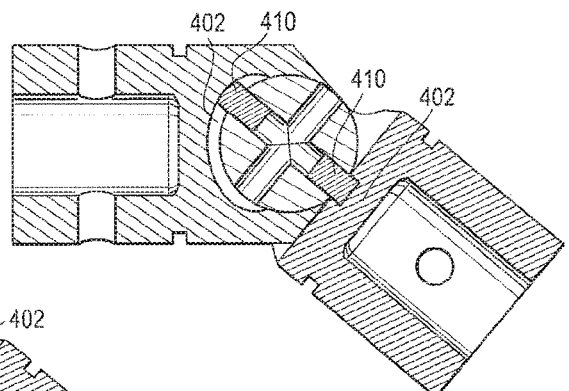
Figure 61B:
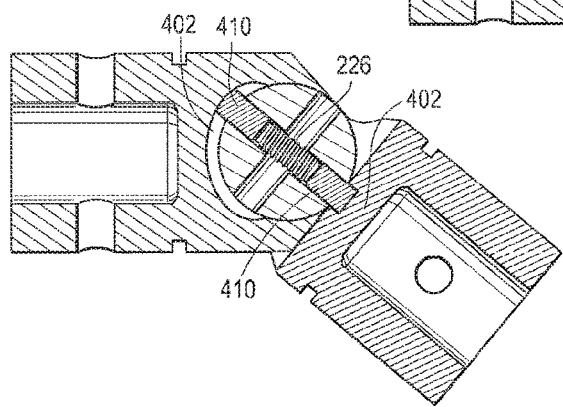

FIGS. 61A and B show cross-sectional views of another embodiment of an assembly with a central element and retaining members and with a central element, retaining members and a biasing member respectively.

Figure 62:
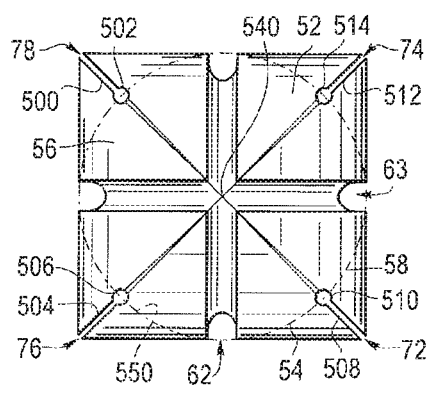

FIG. 62 is a top or bottom view of another embodiment of a central element.

Figure 63:
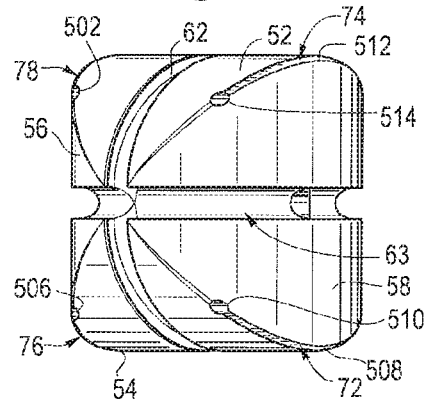

FIG. 63 is side perspective view of the central element shown in FIG. 62.

Figure 64:
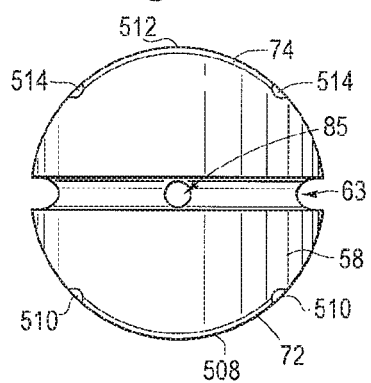

FIG. 64 is a side view of the central element shown in FIG. 62.

Figure 65:
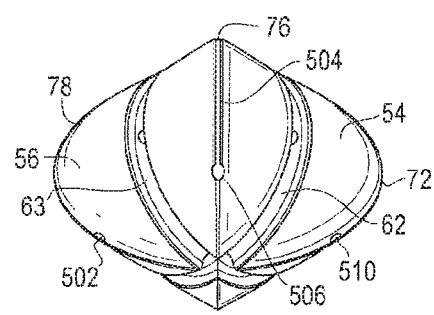

FIG. 65 is corner perspective view of the central element shown in FIG. 62.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the term "plurality," as used herein, means two or more. The term "longitudinal," as used herein means of or relating to length or the lengthwise direction of the input or output arms, including a longitudinal axis thereof 2. The term "lateral," as used herein, means directed between or toward (or perpendicular to) the longitudinal direction, including a lateral axis 4. The term "coupled" means connected to or engaged with, whether directly or indirectly, for example with an intervening member, and does not require the engagement to be fixed or permanent, although it may be fixed or permanent. The term "transverse" means extending across an axis, and/or substantially perpendicular to an axis. It should be understood that the use of numerical terms "first," "second," "third," etc., as used herein does not refer to any particular sequence or order of components; for example "first" and "second" bearing surfaces may refer to any sequence of such surfaces, and is not limited to the first and second bearing surfaces of a particular component unless otherwise specified. In addition, the recitation of first and second does not mean that the features or items so referenced are differently configured, meaning for example first and second bearing surfaces may be identical, or different.

Input and Output Arms:

Referring to FIGS. 2-6, a linkage assembly 80 includes input and output arms 6 include a distal head portion 8 and a proximal body portion 10. The head portion 8 has an engaging portion configured as C-shaped beak 16 defining a side opening 12 and a cavity 14 having a first radius r. The cavity 14 defines an interior, concave bearing surface 18. The opening 12 and cavity 14 are shaped to receive a central element 50.

Figure 1:
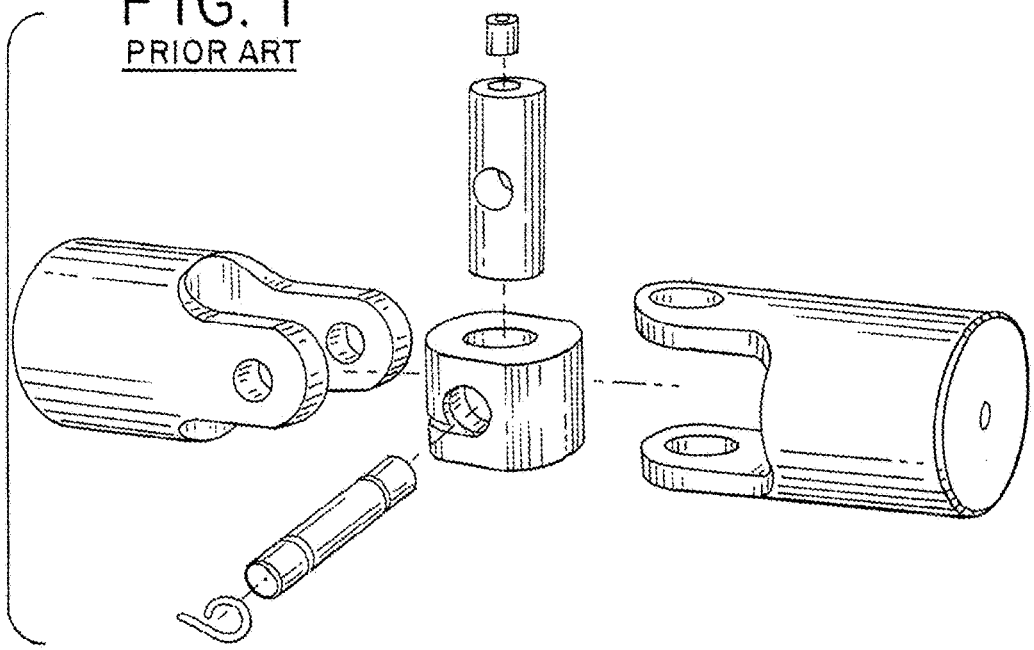
FIG. 1 is an exploded perspective view of a prior art universal joint assembly.
Figure 2:
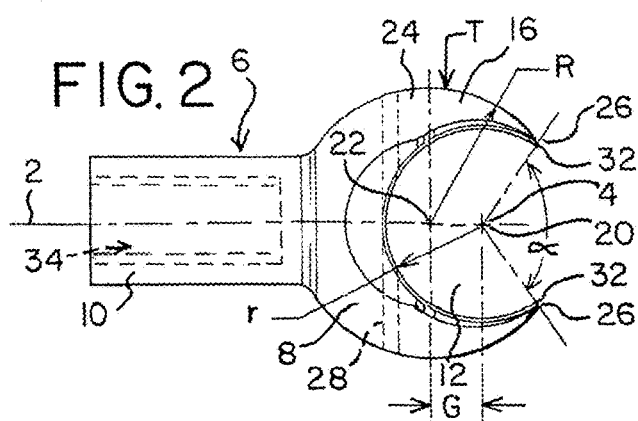
FIG. 2 is a side view of one embodiment of an input or output arm having a head portion.
Figure 3:
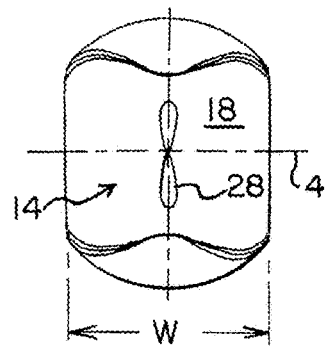
FIG. 3 is a first, end view of the input or output arm shown in FIG. 2.
Figure 5:
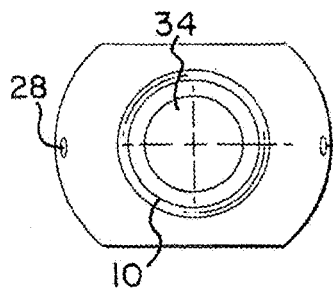
FIG. 5 is a second, end view of the input or output arm shown in FIG. 2.
Figure 4:
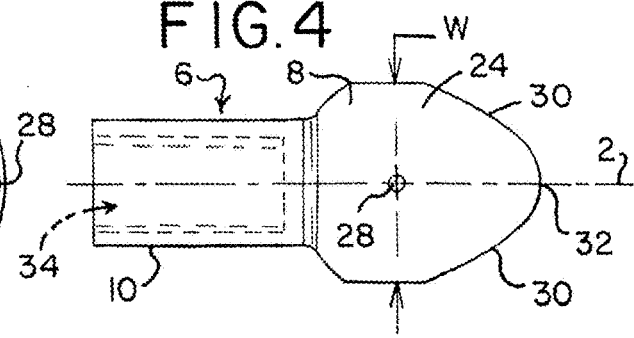
FIG. 4 is a top view of the input or output arm shown in FIG. 2.
Figure 6:
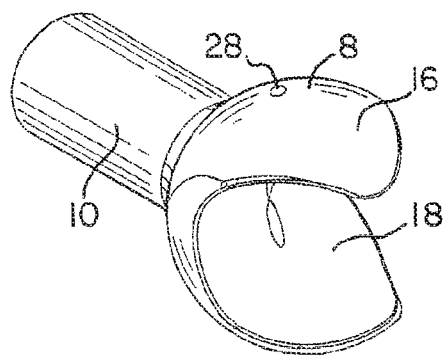
FIG. 6 is a perspective view of the input or output arm shown in FIGS. 2-5.

The center point 20 of the C-shaped opening 12 is spaced apart a distance G from the center point 22 of an outer surface 24 of the head portion along the longitudinal axis 2 in the longitudinal direction, with the center point for the outer surface 24 being closer to the body portion. The offset distance G between the two center points 20, 22 is dimensioned such that a circumferential boundary of the opening 12, defined by radius r, intersects a circumferential boundary of the outer surface 24, defined by radius R, in two locations 26 at the distal end of the input or output arm, as shown in FIG. 2. In various embodiments, the spacing G may be between about 2 mm and 50 mm. The spacing G may be manipulated to optimize the opening distance between the ends 32 for two considerations: (1) the desired angle of misalignment needed and (2) the ability to assemble. If the spacing G is increased, the distance between the ends 32 will increase. In one aspect, G is reduced so as to optimize the distance between the ends with out without sacrificing the misalignment angle, which is defined by the point at which the end 32 interferes with the inner diameter of the opposing rod end. In addition, if G is reduced too much, it may prevent a second head portion from being assembled over a first head portion already coupled to the central element.

The angle α defined by the locations 26 relative to the center point 20 is preferably less than or equal to 170 degrees wide to prevent the central element from pulling through the mouth of either of the input or output arms.

The bearing surface 18 of the cavity 14 is configured with an inner diameter, defined by radius r, which is dimensioned to mate with and correspond to an outer diameter or radius (Rce) of one or more bearing surface(s) 52, 54 or 56, 58 defined by the central element 50, taking into account any necessary allowances for the dimensional tolerance needed to prevent an interference fit between the bearing surfaces.

Referring to FIGS. 2-10, with the linkage viewed from the top or bottom, the width W of the head portion 8 is proximate the diameter (2Rce) of the central element. The width of the head portion 8 is optimized to the angle of misalignment needed and the size of the central element. For example, as shown FIG. 4, the head portion will allow for up to 35 degrees of misalignment. The width may have to be reduced to allow for greater angles of misalignment. When the width is reduced, the radius at the end 32 will be reduced, with the sides 30 being pulled in accordingly. This allows the leading end 32 to reach further into the opening of the opposing head portion without the sides 30 contacting the opposing head portion.

A laterally extending passage 28 for a retaining member 60, such as a pin or spline, is centered on and intersects the longitudinal axis 2 of the head portion and extends into the cavity 14. The passage 28 is approximately tangential to the bearing surface 18. The retaining member 60 is inserted through the passage and is disposed in a groove 62 formed in the central element 50 so as to prevent the central element from exiting the cavity 14 through the opening 12 on either side of the head after assembly. In addition, the retaining member 60 and groove 62 may be dimensioned such that the retaining member locates and centers the head 8 on the central element 50 to provide a smooth operation and rotation of the input and output arms at a predetermined misalignment angle.

Referring to FIGS. 2 and 13, the opening 12 has a radius r, while the outer surface 24 of the head has a radius R. It should be understood that a larger R adds thickness to the beak and provides additional strength thereto, but that the additional thickness may lead to the beak interfering with the bearing surface 18 (defined by r) of the opposing arm, when operating at its maximum designed misalignment angle, typically at an angle equal to or less than 45 degrees. The thickness T of the beak 16 is tapered, or gradually decreases toward a free end 32 thereof due to the intersection of the offset inner radius r and outer radius R of the head portion. The width of the beak or engaging portion, defined by sides 30 or edges of the beak, also tapers inward from being approximately equal to the width W of the head portion and central element to narrowed width at the free end 32. The beak is configured to be as thick as possible without interfering with the inner diameter of the opening 12 or beak 16 of the opposing arm as the linkage assembly rotates through its maximum designed misalignment angle.

The body portion 10 extends along the longitudinal axis 2. The body portion 10 provides a connecting point needed to receive the input torque or deliver the output torque, depending on whether it is configured as part of the input arm or output arm respectively. The shape or cross-section of the body portion, for example circular, rectangular, or polygonal, may be designed in any form that allows it to couple to the torque input or output device with enough strength to transfer the torque load needed for the designed life of the application. In one embodiment, the body portion has a bore 34, which may configured with internal threads, to receive a shaft, which may be threaded with external threads. In other embodiments, the threading may be reversed, or the body portion may be secured to an output or input device 100, 102 by way of welding, couplings or other known devices.

Referring to FIGS. 30A and B, the angled beak 16 is configured in one embodiment by having the free ends 32 terminating at planes angled (a) relative to the center point 20 of the cavity, as explained above. In one embodiment, a is calculated by rotating 45 degrees up and down from the axis 2 for a total of 90 degrees plus an additional 1 degree up and down for clearance, forming an angle α of 92 degrees, with the remaining angle being 268 degrees. It should be understood that in other embodiments, α may be greater than 92 degrees, but less than or equal to 170 degrees.

In one embodiment, the shape of the beak is determined by the inner diameter of the opposing head portion at the maximum angle of misalignment needed. For example, in FIG. 30B the outer surface of the beak 16 has a cylindrical shape with a radius that matches the inner diameter of the opposing head portion and the radii for the four bearing surfaces on the center element.

Referring to FIGS. 35 and 36, the cylindrical outer surface of the beak 16 is shown as approaching the inner diameter of the head portion as it rotates through a maximum angle (e.g., 35 degrees). The beak may be shaped and dimensioned to allow for any misalignment angle up to and including 45 degrees. FIG. 37 shows the opposing head portions at their closest interaction (maximum misalignment) with each other, e.g., 35 degrees. As shown in FIG. 37, the cylinder face of the beak contacts the inner diameter of the opposing head portion at 35 degrees, preventing it from rotating through any additional misalignment.

The radius (Rb) and location of the beak 16 is determined by the inner diameter of the opposing head portion. For example, the radius of the central element (Rce)=the radius (r) of the bearing surface of the opposing head portion=the radius (Rb) for the cylindrical outer surface of the beak 16 (with allowances for tolerance buildup). Additionally the center axis for the radius Rb of the cylinder that defines the outer surface of the beaks 16 will pass through center point 20 for the square ball in the assembly (see FIGS. 30A and 30B, 38 and 39). Accordingly, when locating the beak 16 in relation to the opening 12, the center axis 31 for the beak cylinder passes through the center point 20. This relationship is thereafter easily scalable for any size and angle up to 45 degrees.

When the maximum angle of misalignment for a given application has been determined the beak 16 can be made to accommodate that angle, together with a few additional degrees of allowance as a safety factor. In one example, the application will have a maximum angle of misalignment of 30 degrees with an additional 5 degrees of safety factor. Referring to FIG. 38, two planes 33 are offset 35 degrees from the central axis 2 needed to draw the cylindrical shapes that form the beak on a finished drawing. The cylindrical shapes extend perpendicular to the 35 degree planes. FIG. 39 shows a mid-stage point in the drawing process to help illustrate the cylindrical shape of the beak before the bearing surface 18 is formed. The radius Rb of the beak outer surface is equal to the radius r of the bearing surface.

FIG. 40-42 are three views of the beak after the opening 12 is formed, e.g., machined, through the side of the head portion. Absent any further finishing or machining, the points of the beak will terminate at the 35 degree planes 33 shown in FIGS. 38 and 30B. In one embodiment, the points are too sharp and may not allow enough space between the points of the beak 16 to complete the assembly. Accordingly, the ends 32 of the beak are further finished, e.g., machined, with a radius, making the ends 32 rounded and spaced apart a distance allowing for assembly as shown in FIGS. 35-37.

The new beak design provides for thicker material around the center element. This significantly improves the ability to drive higher torque loads and endure higher pull out loads through the ends 32 of the beak. FIGS. 45 and 46 illustrate assemblies using the beak 16 of FIGS. 3-6 and FIGS. 43 and 44 respectively. An axis 35 is positioned along the center of the center element. The beak 16 in FIG. 46 has a greater thickness above and below the center element along the vertical centerline 35 as compared to the beak 16 shown in FIG. 45, the thickness of which is diminishing well before reaching the vertical centerline 35.

Referring to FIG. 31, a distal portion of the beak 16 may be thinned by forming a shoulder 36, such that a proximal portion of the beak is thicker, and a distal portion of the beak is thinner, which provides additional clearance.

Referring to FIG. 32, a central portion 38 of the cavity 14 may be recessed, such that the recessed portion 38 does not define part of the bearing surface but reduces the weight of the head portion and minimizes frictional forces. In addition, the recessed central portion 38 provides additional clearance in various embodiments where the leading edges of the beak 16 are relatively thin, for example, when 35-45 degree misalignments are required. The recess provides additional clearance so that the leading edges of the beak may be made thicker.

Referring to another embodiment shown in FIGS. 58A-C and 61A and B, another embodiment of the input and output arms 6 include a bearing surface 18 defined by a cavity 14 and a circumferential groove 202, 402 or recess formed in the bearing surface. The groove is disposed in a plane 200 containing the longitudinal axis 2 of the input and output arms 6, and bisects, as shown in FIG. 58B, the opposing portions of the beak 16, which are the same as those disclosed in FIGS. 43, 44 and 46. The groove 202 extends only partially around the bearing surface, with the length thereof being determined by the desired rotational limits of the U-joint. For example, when employed on a U-joint designed to rotate through an angle of up to 45 degrees, the groove will need to extend 45 degrees upwardly and 45 degrees downwardly from a plane 204 orthogonally intersecting plane 200, as shown in FIG. 58B, before the groove starts to fade away, with the ends 212 thereof transitioning into the bearing surface 18. In such an embodiment, the groove 202 extends up to 90 degrees between the ends thereof. The groove 202 may have a shorter or longer trajectory depending on the desired rotational limitations of the U-joint. The groove 202, for example the width and depth thereof, is dimensioned to define a raceway for a retaining member 210, for example a ball bearing or a rounded end of a pin, shown in FIGS. 57D, E and 59A-D, as further explained below. In this embodiment, there is no need for a passage through the head portion. Alternatively, as shown in FIGS. 61A and B, the groove 402 may be shaped to receive a flat end 416 of a cylindrical pin, and is configured with a rectangular cross section, rather than a semi-circular cross section. In this embodiment, the interface between the groove 402 and pin 412 prevent rotation out of the plane of the groove 402.

Referring to FIGS. 33 and 34, a dual head arm 40 is shown as having opposing head portions 8 facing opposite directions and being offset 90 degrees. The head portions are engaged with a central element as explained below. A plurality of dual head assemblies 40 may be chained together as shown in FIG. 34, with an outermost input and output arms being secured at opposite ends of the chain. As shown in FIG. 33, the free end 32 of each head portion is chamfered, or angled outwardly away from the bearing surface 18, such that the beak may be made thicker but not interfere with an adjacent beak. The chamfer on the free end 32 is formed on the beaks to make the opening between them wide enough to allow for assembly, together with the additional benefit of reducing the weight of the assembly.

It should be understood that the heads portions of the dual head arms 40 may be identical, but offset 90 degrees, or may have different shapes and configurations, for example as shown in the various embodiments disclosed herein.

In one embodiment, the maximum misalignment angle of any one joint is 15 degrees, which provides for a transfer torque through a total misalignment of 45 degrees in an embodiment having three central elements. A single joint assembly rotating at 45 degrees of misalignment will oscillate the central element back and forth 90 degrees per revolution within an assembly. If that same assembly is straightened out so both rod ends share the same axis of rotation, the central element will not oscillate, it will simply transfer torque. A chain having three central elements will reduce the maximum amount of oscillation to 30 degrees back and forth per revolution. This allows the three joint design to accommodate approximately three times the revolutions per minute of a single joint design, or last three times longer at the same speed. Also, the friction produced between the bearing surfaces is reduced by a factor of 3 in this embodiment when compared to a single joint assembly serving the same amount of misalignment. A chain can be assembled with as many joints as desired, with the maximum allowance of angle misalignment per joint determined by the beak angle of the dual head design.

Since the movement of the central element is oscillating back and forth, efforts to minimize that movement are rewarded with extended life expectancy. Two primary considerations of determining the ability of a sliding bearing to serve an application are Pressure and Velocity (P×V). Adding additional joints with a dual head design will reduce the velocity and amount of oscillation rotation per revolution if all other factors remained the same. The oscillation reduction is greater with each additional joint added to the chain.

This multiple joint chain design will function as a constant velocity joint. In one example, the opposing head portions are offset 90 degrees from each other, with it being understood that the offset amount between the dual heads can be oriented at any angle from 0-90 degrees as needed for an application. There is a possibility that this angle of offset between the opposing heads will need to be phased at some angle to achieve a constant velocity output.

In various embodiments, the input and output arms are made of metal, including for example bearing steel, carbon steels, alloy steel, aluminum, and stainless steel, although they may also be made of other materials, including various plastics and composites.

Figure 8:
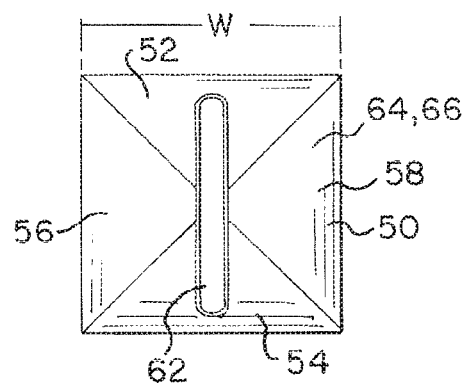
FIG. 8 is a top or bottom view of the central element shown in FIG. 7.

Central Element:

Referring to FIGS. 7-10, one embodiment of the central element has opposing first and second convexly shaped bearing surfaces 52, 54, and opposing third and fourth convexly shaped bearing surfaces 56, 58, with the bearing surface 18 defined by the cavity of the head of one of the input or output arms engaging the first and second bearing surfaces 52, 54, or the third and fourth bearing surfaces 56, 58. The bearing surfaces 52, 54, 56, 58 have an approximate radius Rce as explained above. The central element has a top and bottom 64, 66 that define generally rectangular shapes in projected planar views. It should be understood that the top and bottom may be interchangeable, as suggested by FIG. 8, but with the groove 62 offset by 90 degrees. It should be understood that a square is a rectangle, and that the rectangular shape of the projected top and bottom is a square in one embodiment, as shown in FIG. 8. The central element further includes four sides 68, 70 that define elliptical shapes in projected planar views, as shown in FIGS. 9A and 9B. It should be understood that a circle is an ellipse, and that in one embodiment, the elliptical shape is circular. The diameter of the projected circles 68, 70, or 2Rce of the bearing surfaces, may vary, for example and without limitation including and between 20 mm and 150 mm, or including and between 25 mm and 102 mm, or other lesser or greater diameters. The intersecting bearing surfaces 52, 54, 56 and 58 define four apices 72, 74, 76, 78, or corners, that intersect at the top and bottom of the central element, although the point of intersection may be virtual where material is removed by way of forming openings, slots and flat portions.

The central element includes a first groove 62 extending along a portion of the perimeter of the central element on at least one of the four sides 68, 70 and a second groove 63 extending along a portion of the perimeter of the central element on at least one of the other of the four sides, wherein the first and second grooves 62, 63 are offset 90 degrees. For example, as shown in FIGS. 7-10, a first groove 62 may extend across first and second bearing surfaces 52, 54 on a top of the central element, and a second groove 63 may extend across third and fourth bearing surfaces 56, 58 on a bottom of the central element.

In other embodiments, shown in FIGS. 11, 17-19, 53-55 and 62-65, the first and second grooves 62, 63 each extend around an entirety of the perimeter of the central element, with the first and second grooves 62, 63 intersecting at a top and bottom of the central element, and bisecting each of the bearing surfaces 52, 54, 56, 58. Grooves 62, 63 that extend 360 degrees around the central element are easier to machine. In one embodiment, shown in FIGS. 20-22, the central element may be configured with only one groove 62. In one embodiment, the top and bottom 64, 66 may be provided with a flat surface 82, such that the elliptical side views have a flat spot along the top and bottom thereof, as shown for example in FIGS. 19, 11 and 22.

Referring to FIGS. 23-26, 53-55 and 62-65, alternative embodiments of a central element are shown. In one embodiment shown in FIGS. 23-26, the central element has a bore 84, or opening, extending from a top to a bottom thereof. In the embodiments of FIGS. 53-55 and 62-65, the central element has a pair of orthogonally positioned bores 83, 85, or openings, aligned with the grooves 62, 63 and each extending through the central element from opposite sides thereof, with the bores 83, 85 intersecting in the interior or middle of the central element. The bores 83, 84, 85, or openings, reduce the amount of material of the central element, and the attendant weight thereof. In addition, the bores provide a reservoir for lubricant, such as grease. The bores may be filled with grease before the second output/input arms are coupled to the central element. The bores may also provide a convenient tooling feature, helping hold the part during the machining operation.

Referring to the embodiment of FIGS. 62-65, the central element includes a relief slot 500, 504, 508, 512 or cut formed in each of the four apices or corners 72, 74, 76, 78. The slots 500, 504, 508, 512 extend radially inwardly along a respective corner 72, 74, 76, 78 toward a center axis 540. The depth and width of the corner slots 500, 504, 508, 512 can be adjusted as needed to the specific requirements of a given application, in effect tuning the central element to the application. In various embodiments, the width of the slot may vary depending on the size of the central element, for example as determined by the diameter of the projected circle 68, 70, or corresponding radius of the bearing surfaces 52, 54, 56, 58. For example, the slot may have a width less than or equal to 10 mm and greater than 0 in one embodiment, less than 6 mm and greater than 0 in another embodiment, or between and including 1 mm and 5 mm. Each of the slots 500, 504, 508, 512 preferably terminate interiorly at an enlarged opening 502, 506, 510, 514, for example an opening having a circular cross-section when viewed from the top or bottom of the central element. The opening is a through opening, having for example a cylindrical shape. The cross-section of the opening may be configured in other shapes without a sharp edge. The openings reduce stress risers created at the bottom (interior portions) of the slots when torque loads on the input/output arms 6 transfer through the central element with enough force to flex the material adjacent the slots 500, 504, 508, 512, causing a reduction in the width of the slot. The openings 502, 506, 510, 512 preferably have a greater dimension, e.g., diameter, than the width of the corresponding slot. In one embodiment, the depth of the slots 500, 504, 508, 512 extend such that the openings 502, 506, 510, 512 are spaced, on a projected surface as shown for example in FIG. 62, proximately the same distance from a center 540 as the outermost tangent of the bearing surfaces 52, 54, 56, 58, or stated another way, the openings 502, 506, 510, 512 are located on a projected circle 550. It should be understood that the openings 502, 506, 510, 512 may be positioned radially inwardly or outwardly from the projected circle 550. The corner slots 500, 504, 508, 512 are included for applications with higher torque load and or shock load attributes.

The corner slots 500, 504, 508, 512 allow the material near the apices or corners 72, 74, 76, 78 of the central element to absorb and distribute high loads from the input arm 6 to the output arm 6. When torque loads high enough to flex the material adjacent to the slot are encountered, the slot(s) 500, 504, 508, 512 allow the corners or edges of the central element to flex. As the central element flexes the load is distributed over a larger contact area between the mouth of the input/output arms and the central element. A larger contact area reduces the surface pounds per square inch pressure between the input and output arms and the central element. By reducing the pressure applied and exchanged between the working surfaces of the central element and the input and output arms, the expected life of the assembly improves, for example by reducing friction, reducing heat generated by friction, and reducing metal fatigue.

Referring to FIGS. 47-51, yet another embodiment of a central element 250 is shown. The central element 250 has first and second grooves 62, 63, with openings 240, 260, having a larger diameter than the grooves, extending through the central element and forming the ends of the respective grooves. Again, the openings may provide a lubricant reservoir and reduce the weight of the central element.

Referring to FIGS. 56A-D, another embodiment of a central element is configured without any grooves. Instead, the central element has an opening 220, on each of the top and bottom thereof. The openings may be formed as opposing mouths of a through hole 222 that extends through the central element, or may be formed independently at each of the top and bottom. In one embodiment, the openings are dimensioned to receive first and second retaining members 210, which are engaged with corresponding grooves 202 on the head portions of the input and output arms. The openings are centered on the corner of the apices 72, 74, 76, 78.

The central element may also be configured with a second through hole 224, which extends through the center of opposing bearing surfaces 52, 54 or 56, 58. In one embodiment, a pair of second openings may intersect. The second opening(s) 224 may be included as a lightening hole, which reduces the weight of the central element. In one embodiment, the central element is not configured with any second openings.

The central element is preferably made of a material that has a low coefficient of friction relative to the arm members, for example metal, ceramic, or corresponding plastics and composites.

Assembly:

Referring to FIGS. 14-16, the linkage assembly 80 may be assembled by orienting the central element 50 and one of the first or input arms 6 such that the outer surface of the central element, or pair of bearing surfaces 52, 54, or 56, 58 are concentric or aligned with the inner surface of the c-shaped opening 12. When the central element is correctly oriented the central element 50 slides through the c-shaped opening 12 into the cavity 14 with the opposing bearing surfaces 52, 54 being engaged with the bearing surface 18 of the cavity 14. The groove 62, 63 on the central element is then aligned with the passage 28 formed through the head. A retaining member 60 is then inserted through the passage 28 and is disposed in the groove 62. The retaining member 60 is secured, for example by bending or deforming one or more ends thereof, with another end thereof being enlarged, such that the retaining member cannot be removed from the passage 28. Alternatively, or in addition, the passageway 28 may be sized to define an interference fit with the retaining member 60. The retaining member may be disposed entirely within the passageway such that it does not protrude from either end of the input/output arm.

The central element 50 is then rotated or rolled away from the body portion of the connected arm until an end of the first groove 62 comes into contact with the first retaining pin 60. In this orientation, the other of the input or output arms has a c-shaped opening 12 aligned to slidingly receive the central element without interfering with the beak 16 of the input arm. The central element 50 is then slid or translated relative to the receiving arm with the bearing surface 18 of the output arm and the bearing surface 56, 58 of the central element being engaged. The second passageway 28 for the second retaining member 60 is aligned with the second groove 63 of the central element and the second retaining pin is inserted through the second passageway and is disposed in the groove 63. The retaining member may be fixed to the heads, for example by interference fit, with the retaining member being pressed into the passageway 28 of either arm, or alternatively, by bending, flattening or deforming one or more end portions thereof, with the other end portion being enlarged. The retaining member may be configured as a cotter pin, needle bearing, or other pin or spline member, and may have a circular or other cross-sectional shape.

Referring to the embodiment of FIGS. 57A-E and 61A and B, the linkage assembly 80 may be assembled by orienting the central element 50 and one of the first or input arms 6 such that the outer surface of the central element, or pair of bearing surfaces 52, 54, or 56, 58 are concentric or aligned with the inner surface of the c-shaped opening 12. One or more retaining elements 210, 310, 410 are disposed in the openings 220 of the central element. In one embodiment, where the central element includes a through opening 222, a spring 226 is disposed in the opening 222 between the retaining members 210, configured for example as ball bearings. As shown in FIGS. 59A-D, the retaining element 310 may be configured with a cylindrical body 312 having a rounded end 314, which engages and rides in the groove 202, and a flat end 316, which may be biased by the spring 226. Referring to FIGS. 60A-C, the retaining member 410 may be configured with a cylindrical body 412 having opposite flat ends 416, with one end 416 engaging and riding in a square groove 402, shown in FIGS. 61A and B, and the other end 416 being engaged by the spring 226. The spring 226 biases the retaining members 210, 310, 410 radially outwardly from the central element.

When the central element is correctly oriented the central element 50 slides through the c-shaped opening 12 into the cavity 14 with the opposing bearing surfaces 52, 54 being engaged with the bearing surface 18 of the cavity 14. The retaining member 210, 310, 410 is disposed in the groove 202, 402. The other of the input or output arms has a c-shaped opening 12 aligned to slidingly receive the central element. The central element 50 is then slid or translated relative to the receiving arm with the bearing surface 18 of the other of the input or output arm and the bearing surface 56, 58 of the central element being engaged. The retaining member 210, 310, 410 is disposed in the groove 202, 402. During the sliding operations, the retaining members 210, 310, 410 may be pressed internally into the through opening to allow for the sliding of the central element relative to the head portions 6, with the spring 216 thereafter biasing the retaining members into engagement with the grooves 202, 402. The spring 226 applies continuous pressure to both retaining members 210, 310, 410 to keep them engaged with the grooves 202, 402 in the head portions of the input and output arms.

The linkage assembly 80 may be lubricated with any lubricant to the exposed areas of the central element, with the lubricant being distributed by movement of each arm. The linkage assembly may be lined with self-lubricating materials or needle bearings to help reduce friction and wear. In addition, lubricant may be periodically added to the bore 83, 85, 85, or other opening, in the central element, such that continued distribution of lubricant is provided over time.

Referring to FIGS. 27 and 28, a boot 120 or cover may be installed around the linkage assembly. The boot has an annular flange 122 at the ends thereof that are received in annular grooves 128 formed on the body portion, as shown in FIGS. 26, 29 and 33. The boot 120 may be configured with pleats 124 to allow the boot to expand, bend and/or deform during use, for example to allow the ends thereof to be angled up to 45 degrees. Other seals or covers may be installed, preferably after lubricant is applied to the assembly.

In one embodiment, shown in FIG. 52, an input device 102 includes a steering interface 130, such as a steering wheel or handle, which is coupled to the body portion 10 of the input arm, and an output device 100 includes a ground interface 140, such as a wheel, skid, track or other known device, which is coupled to the body portion 10 of the output arm, for example with intervening gear boxes, links and/or other components. More than one linkage assembly may be disposed between the input and output devices as needed.

The linkage is scalable and easily designed to meet the specific needs of an application when some or all of the following variables have been determined. 1) the space envelope the linkage assembly has to work within; 2) the maximum and operating torque loads of the application; 3) the angle of misalignment needed to transfer torque through; 4) the working environment conditions; 5) the life expectancy of the linkage assembly; 6) any weight restrictions that may influence the type of material selected for the central element or input and output arms; and 7) the method for mating the linkage assembly with the input and output devices.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A linkage system for transmitting torque comprising:
a central element having four sides that define elliptical shapes in projected planar views and a top and bottom that define generally rectangular shapes in projected planar views, wherein the central element includes a first groove extending along a portion of the perimeter of the central element on at least one of the four sides;
an input arm and an output arm each having a head portion for connecting with the central element and a body portion extending longitudinally from the head portion, wherein the head portion of both the input and output arms defines a bearing surface having a first radius, wherein the input and output arms engage the central element such that the bearing surfaces of each head portion are offset by 90 degrees; and
a first retaining pin coupled to one of the input and output arms and disposed in the first groove.

2. The linkage system according to claim 1 wherein the central element further comprises a second groove extending along a portion of the perimeter of the central element on at least one of the other of the four sides, wherein the first and second grooves are offset 90 degrees, and further comprising a second retaining member coupled to the other of the input and output arms and disposed in the second groove.

3. The linkage system according to claim 2, wherein the head of the input arm defines a first passage and wherein the first retaining pin extends through the first passage and is disposed in the first groove for centering the central element relative to the axis of the input arm.

4. The linkage system of claim 3 wherein the first passage is tangential to the bearing surface of the input arm head portion.

5. The linkage system of claim 4 wherein the first retaining pin extends laterally through the first passageway.

6. The linkage system according to claim 2, wherein the first and second grooves each extend around a perimeter of the central element, and wherein the first and second grooves intersect.

7. The linkage system according to claim 2, wherein the central element further comprises a hole extending therethrough from the top to the bottom.

8. The linkage system of claim 2 wherein the second retaining member comprises a second retaining pin.

9. The linkage system according to claim 1, wherein the four sides each have a convex surface defined by a first radius and the head portion of each of the input and output arms defines a cavity have a concave surface having a second radius substantially mating with the first radius.

10. The linkage system according to claim 9, wherein the head portion of each of the input and output arms defines a c-shaped cavity engaging more than 180 degrees of the central element.

11. The linkage system according to claim 10, wherein the first and second sides of the central element are opposing and the third and fourth sides of the central element are opposing, wherein the head portion of the input arm contacts the first and second opposing sides, and the head portion of the output arm contacts the third and fourth opposing sides.

12. The linkage system according to claim 11, wherein the head portion of each of the input and output arms comprises a beak portion defining an outer face, wherein the outer face comprises sides that converge toward an end portion thereof.

13. The linkage system of claim 1 wherein the four sides, top and bottom are defined by four bearing surfaces intersecting at four corners.

14. The linkage system according to claim 1, wherein the body portion of the each of the input and output arms defines a bore adapted to be connected to a shaft.

15. The linkage system according to claim 14, wherein the bore comprises a threaded socket.

16. The linkage system of according to claim 1 wherein the head has a width approximately equal to a width of a mating one of the sides of the central element.

17. A steering column comprising:
a steering interface; and
the linkage system of claim 1, wherein the steering interface is coupled to the input arm.

18. A linkage system for transmitting torque comprising:
a central element having four sides that define elliptical shapes in projected planar views and a top and bottom that define generally rectangular shapes in projected planar views, wherein the four sides, top and bottom are defined by four bearing surfaces intersecting at four corners, wherein each of the corners comprises a slot extending radially inwardly from a respective one of the corners, and wherein the central element includes a first groove extending along a portion of the perimeter of the central element on at least one of the four sides;

an input arm and an output arm each having a head portion for connecting with the central element and a body portion extending longitudinally from the head portion, wherein the head portion of both the input and output arms defines a bearing surface having a first radius, wherein the input and output arms engage the central element such that the bearing surfaces of each head portion are offset by 90 degrees; and a first retaining member coupled to one of the input and output arms and disposed in the first groove.

19. The linkage system of claim 18 wherein the slots are terminated at an enlarged opening having a greater width than a width of the corresponding slot.

20. A linkage system for transmitting torque comprising:
a central element having four sides that define elliptical shapes in projected planar views and a top and bottom that define generally rectangular shapes in projected planar views, wherein the central element includes a first groove extending along a portion of the perimeter of the central element on at least one of the four sides and a second groove extending along a portion of the perimeter of the central element on at least one of the other of the four sides, wherein the first and second grooves are offset 90 degrees, wherein the first and second grooves each extend around a perimeter of the central element, and wherein the first and second grooves intersect, and wherein the central element further comprises a pair of orthogonally positioned bores aligned with the first and second grooves and extending through the central element, wherein the pair of bores intersect in the interior of the central element;

an input arm and an output arm each having a head portion for connecting with the central element and a body portion extending longitudinally from the head portion, wherein the head portion of both the input and output arms defines a bearing surface having a first radius, wherein the input and output arms engage the central element such that the bearing surfaces of each head portion are offset by 90 degrees;

a first retaining member coupled to one of the input and output arms and disposed in the first groove; and a second retaining member coupled to the other of the input and output arms and disposed in the second groove.

21. A linkage system for transmitting torque comprising:
a central element having four sides that define elliptical shapes in projected planar views and a top and bottom that define generally rectangular shapes in projected planar views, wherein first and second sides of the central element are opposing and third and fourth sides of the central element are opposing, wherein the four sides each have a convex surface defined by a first radius and wherein the central element includes a first groove extending along a portion of the perimeter of the central element on at least one of the four sides;

an input arm and an output arm each having a head portion for connecting with the central element and a body portion extending longitudinally from the head portion, wherein the head portion of both the input and output arms defines a bearing surface having a first radius, wherein the head portion of each of the input and output arms defines a c-shaped cavity having a concave surface with a second radius substantially mating with the first radius, wherein the head portion of each of the input and output arms comprises a beak portion defining an outer face, wherein the outer face comprises sides that converge toward an end portion thereof, wherein the beak portion is thinner at the end portion thereof, and wherein the head portion of the input arm contacts the first and second opposing sides, and the head portion of the output arm contacts the third and fourth opposing sides, wherein the input and output arms engage the central element such that the bearing surfaces of each head portion are offset by 90 degrees, and wherein the c-shaped cavity engages more than 180 degrees of the central element; and a first retaining member coupled to one of the input and output arms and disposed in the first groove.

22. A method for assembling a linkage assembly comprises:
aligning a central element, having opposite first and second bearing surfaces each defined by a first radius, with a c-shaped cavity of a head portion of an input arm, wherein the cavity defines a third bearing surface, wherein the central element comprises four sides that define elliptical shapes in projected planar views and a top and bottom that define generally rectangular shapes in projected planar views, wherein the central element includes a first groove extending along a portion of the perimeter of the central element on at least one of the four sides and a second groove extending along a portion of the perimeter of the central element on at least one of the other of the four sides, wherein the first and second grooves are offset 90 degrees, and wherein the input arm comprises a body portion extending longitudinally from the head portion;

sliding the central element into the cavity of the head portion of the input arm with the first and second bearing surfaces engaging the third bearing surface;

inserting a first pin through a first passage in the head portion of the input arm;

disposing the first pin in the first groove extending around at least a portion of the perimeter of the central element;

aligning the central element, having opposite third and fourth bearing surfaces each defined by a second radius, with a c-shaped cavity of a head portion of an output arm, wherein the cavity defines a fifth bearing surface, and wherein the output arm comprises a body portion extending longitudinally from the head portion of the output arm;

sliding the central element into the cavity of the head portion of the output arm with the third and fourth bearing surfaces engaging the fifth bearing surface;

inserting a second pin through a second passage in the head portion of the output arm; and disposing the second pin in the second groove extending around at least a portion of the perimeter of the central element.

* * * * *